US011664887B2

(12) United States Patent
Nuttall et al.

(10) Patent No.: US 11,664,887 B2
(45) Date of Patent: *May 30, 2023

(54) HUB COMMUNICATION WITH A SATELLITE NETWORK OR A TERRESTRIAL NETWORK

(71) Applicant: Skylo Technologies, Inc., Palo Alto, CA (US)

(72) Inventors: Andrew Nuttall, Mountain View, CA (US); Moshe Noah, Sunnyvale, CA (US); Vijay Lewis, Wylie, TX (US); Meghna Agrawal, Cupertino, CA (US); Kalle Ruttik, Espoo (FI); Yihenew Dagne Beyene, Espoo (FI); Barry Winata, Mountain View, CA (US)

(73) Assignee: Skylo Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,813

(22) Filed: Oct. 30, 2022

(65) Prior Publication Data

US 2023/0059321 A1 Feb. 23, 2023

Related U.S. Application Data

(63) Continuation of application No. 16/852,240, filed on Apr. 17, 2020, now Pat. No. 11,515,937, which is a
(Continued)

(51) Int. Cl.
*H04B 7/185* (2006.01)
*H04B 7/204* (2006.01)
*H04B 7/155* (2006.01)

(52) U.S. Cl.
CPC ....... *H04B 7/18582* (2013.01); *H04B 7/1555* (2013.01); *H04B 7/18586* (2013.01); *H04B 7/2048* (2013.01)

(58) Field of Classification Search
CPC .............. H04B 7/1555; H04B 7/18582; H04B 7/18586; H04B 7/2048; H04B 7/18517
See application file for complete search history.

(56) References Cited

U.S. PATENT DOCUMENTS

| 5,884,168 A | 3/1999 | Kolev et al. |
| 6,411,806 B1 | 6/2002 | Garner et al. |

(Continued)

FOREIGN PATENT DOCUMENTS

WO WO 2017/219148 12/2017

OTHER PUBLICATIONS

Notification of Transmittal of the International Search Report and the Written Opinion of the International Searching Authority, or the Declaration, PCT/US20/046336, dated Oct. 10, 2020.
(Continued)

*Primary Examiner* — Elton Williams
(74) *Attorney, Agent, or Firm* — Brian R. Short

(57) ABSTRACT

Apparatuses, methods, and systems of hub communication with a satellite network or a terrestrial network are disclosed. One method includes detecting presence of the satellite network, detecting, by the hub, presence of a terrestrial network, selecting to connect to one of the satellite network or the terrestrial network based on a priority ruleset, estimating a propagation delay between the hub and a base station of the satellite network when the satellite network is selected, adjusting a timing offset between transmit and receive radio frames at the hub based on whether the satellite network or the terrestrial network is selected, and based at least on the propagation delay and a frame offset between uplink and downlink frames at base station, and communicating with the base station of the satellite network or a base station of the terrestrial network.

19 Claims, 16 Drawing Sheets

Related U.S. Application Data continuation-in-part of application No. 16/718,574, filed on Dec. 18, 2019, now Pat. No. 11,329,745.

(60) Provisional application No. 62/914,438, filed on Oct. 12, 2019, provisional application No. 62/890,553, filed on Aug. 22, 2019.

(56) References Cited

U.S. PATENT DOCUMENTS

| | | |
|---|---|---|
| 6,591,084 B1 | 7/2003 | Chuprun et al. |
| 6,681,099 B1 | 1/2004 | Keranen et al. |
| 6,714,760 B2 | 3/2004 | Robinett |
| 6,956,829 B2 | 10/2005 | Lee et al. |
| 8,326,319 B2 | 12/2012 | Davis |
| 9,455,777 B1 | 9/2016 | Johnson et al. |
| 9,622,259 B2 | 4/2017 | Johnson et al. |
| 11,515,937 B2 * | 11/2022 | Nuttall ............... H04B 7/1555 |
| 2001/0012775 A1 | 9/2001 | Modzelesky |
| 2005/0265321 A1 | 1/2005 | Rappaport et al. |
| 2006/0050736 A1 | 3/2006 | Segel |
| 2009/0316621 A1 | 12/2009 | Lane et al. |
| 2009/0323607 A1 | 12/2009 | Park et al. |
| 2010/0034191 A1 | 11/2010 | Schulz |
| 2011/0222492 A1 | 9/2011 | Borsella et al. |
| 2014/0029586 A1 | 1/2014 | Loehr et al. |
| 2014/0181288 A1 | 6/2014 | Potkonjak |
| 2015/0057046 A1 | 2/2015 | Challa et al. |
| 2015/0340762 A1 | 11/2015 | Yakubovitch et al. |
| 2016/0020985 A1 | 1/2016 | Swartzentruber et al. |
| 2016/0125471 A1 | 5/2016 | Hsu et al. |
| 2016/0006526 A1 | 7/2016 | Cho et al. |
| 2017/0048774 A1 | 2/2017 | Cheng et al. |
| 2017/0188322 A1 | 6/2017 | Borsella et al. |
| 2018/0034694 A1 | 2/2018 | Farnham |
| 2018/0212748 A1 | 7/2018 | Liu et al. |
| 2019/0260464 A1 | 8/2019 | Roy et al. |

OTHER PUBLICATIONS

Notification of Transmittal of the International Search Report and the Written Opinion of the International Searching Authority, or the Declaration, PCT/US20/48941, dated Dec. 14, 2020.

* cited by examiner

Synchronization of Data Source/Hub with
Network Server

First Turn on and Provisioning (Infrequent)

Hub Connects to Satellite
1310

↓

Download Hub Profile
1320

Connect to Base Station Flow (Frequent)

Hub Connects to Satellite
1330

↓

Share Hub Profile with Data Device(s)
1340

↓

Request Synchronization Parameters
1350

Figure 13

```
┌─────────────────────────────────────────────────────────────────────┐
│   Receiving, by a base station, one or more preambles from a set of │
│                  one or more data sources                           │
│                  during a scheduled time slot                       │
│                            1410                                     │
└─────────────────────────────────────────────────────────────────────┘
                                  │
                                  ▼
┌─────────────────────────────────────────────────────────────────────┐
│  Receiving, by the base station, one or more virtual preambles      │
│  from a network server during the scheduled time slot, wherein the  │
│  one or more virtual preambles are associated with another set      │
│                  of one or more data sources                        │
│                            1420                                     │
└─────────────────────────────────────────────────────────────────────┘
                                  │
                                  ▼
┌─────────────────────────────────────────────────────────────────────┐
│  Generating, by the base station, responses to the preambles and    │
│  the virtual preambles, wherein the responses included scheduled    │
│  time and frequency allocations for uplink communication            │
│  from the set of one or more data sources and the other set of one  │
│                        or more data sources                         │
│                            1430                                     │
└─────────────────────────────────────────────────────────────────────┘
                                  │
                                  ▼
┌─────────────────────────────────────────────────────────────────────┐
│  Transmitting, by the base station, the responses to the set of     │
│  one or more data sources and the                                   │
│           other set of one or more data sources                     │
│                            1440                                     │
└─────────────────────────────────────────────────────────────────────┘
```

Figure 14

HUB COMMUNICATION WITH A SATELLITE NETWORK OR A TERRESTRIAL NETWORK

RELATED PATENT APPLICATIONS

This patent application is a continuation of U.S. patent application Ser. No. 16/852,240, filed Apr. 17, 2020, which is a continuation-in-part (CIP) of U.S. patent application Ser. No. 16/718,574, filed Dec. 18, 2019, and which claims priority to Provisional Patent Application Ser. No. 62/890,553 filed Aug. 22, 2019, and to Provisional Patent Application Ser. No. 62/914,438 filed Oct. 12, 2019, which are herein incorporated by reference.

FIELD OF THE DESCRIBED EMBODIMENTS

The described embodiments relate generally to wireless communications. More particularly, the described embodiments relate to systems, methods and apparatuses for hub communication with a satellite network or a terrestrial network.

BACKGROUND

Current data networks are designed primarily for human users and the network and traffic characteristics that human users generate. The growth and proliferation of low-cost embedded wireless sensors and devices pose a new challenge of high volumes of low bandwidth devices vying for access to limited network resources. One of the primary challenges with these new traffic characteristics is the efficiency at which the shared network resources can be used. For common low bandwidth applications such as GPS tracking, the efficiency (useful/useless data ratio) can often be below 10%. This inefficiency is the result of large volumes of devices communicating in an uncoordinated environment. Addressing this problem is fundamental to the future commercial viability of large-scale sensor network deployments.

It is desirable to have methods, apparatuses, and systems for a hub communicating with a satellite network or a terrestrial network.

SUMMARY

An embodiment includes a method of hub communication with a satellite network or a terrestrial network. The method includes detecting, by a hub, presence of the satellite network, detecting, by the hub, presence of a terrestrial network, selecting, by the hub, to connect to one of the satellite network or the terrestrial network based on a priority ruleset, estimating a propagation delay between the hub and a base station of the satellite network when the satellite network is selected, adjusting, by the hub, a timing offset between transmit and receive radio frames at the hub based on whether the satellite network or the terrestrial network is selected, and based at least on the propagation delay and a frame offset between uplink and downlink frames at base station, and communicating, by the hub, with the base station of the satellite network when the satellite network is selected, and with a base station of the terrestrial network when the terrestrial network is selected.

Another embodiment includes a wireless hub. The wireless hub is operative to detect presence of a satellite network, detect presence of a terrestrial network, select to connect to one of the satellite network or the terrestrial network based on a priority ruleset, estimate a propagation delay between the hub and a base station of the satellite network when the satellite network is selected, adjust a timing offset between transmit and receive radio frames at the hub based on whether the satellite network or the terrestrial network is selected, and based at least on the propagation delay and a frame offset between uplink and downlink frames at base station, and communicate with the base station of the satellite network when the satellite network is selected, and with a base station of the terrestrial network when the terrestrial network is selected.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 13 shows flow charts that include processes in which a hub connects to a satellite, according to an embodiment.

FIG. 14 is a flow chart that includes steps of a method of data reporting, according to an embodiment.

DETAILED DESCRIPTION

The embodiments described include methods, apparatuses, and systems for a hub selecting and connecting to a satellite network or a terrestrial network.

Figure 1:
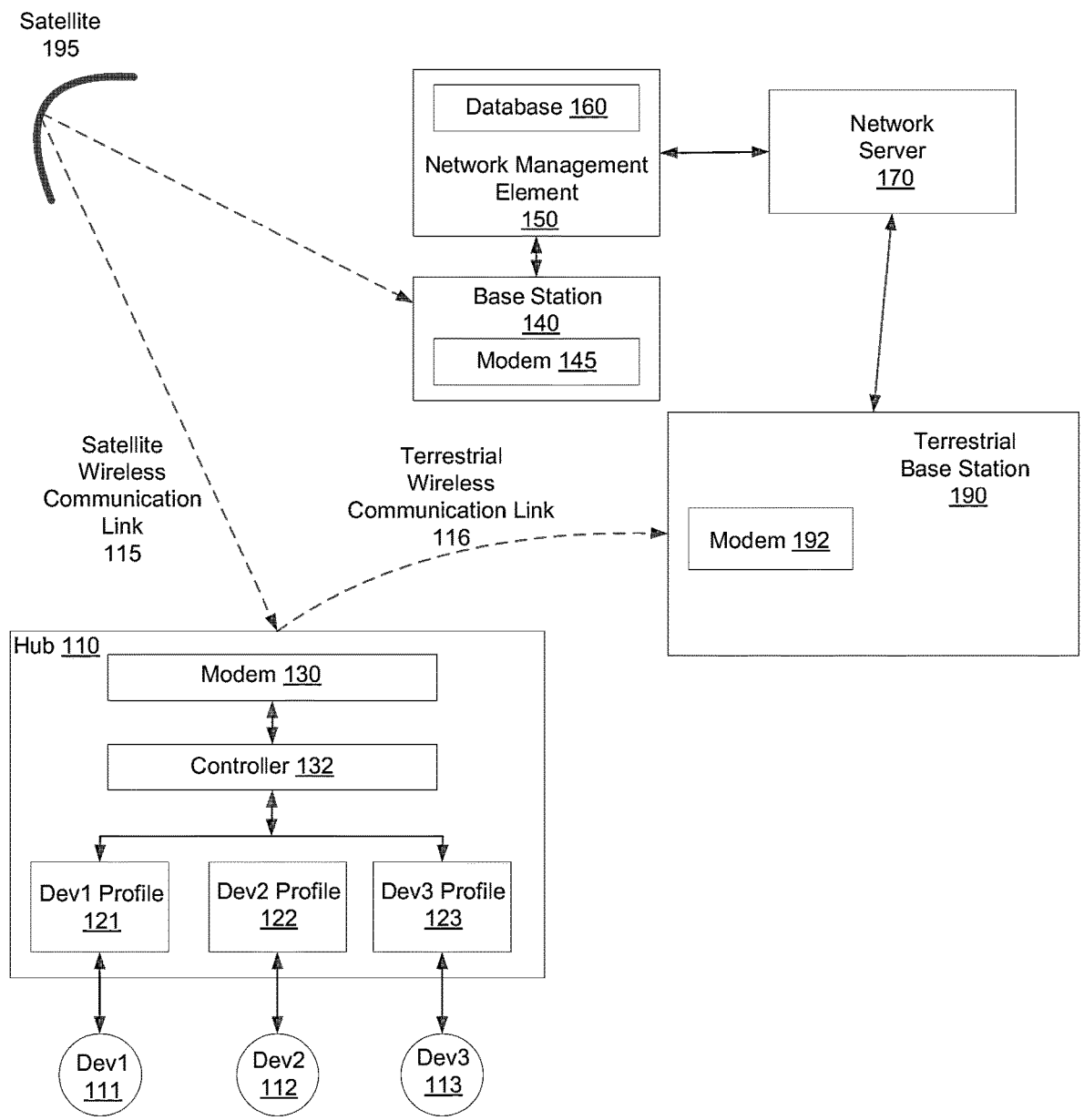
FIG. 1 shows a hub that communicates data of data sources through either a satellite link to a base station of a satellite network or through terrestrial link to a base station of a terrestrial network, according to an embodiment.

FIG. 1 shows a hub 110 that communicates data of data sources 111, 112, 113 through either a satellite link 115 to a base station 140 of a satellite network or through terrestrial link 116 to a base station 190 of a terrestrial network, according to an embodiment. For an embodiment, the hub 110 selects which of the satellite network or the terrestrial network to connect based on a priority rule set. That is, for example, the hub 110 evaluates conditions associated with the two wireless links 115, 116 or conditions of the data to be communicated, and selects which of the satellite network or the terrestrial network to connect based on the evaluated conditions.

For an embodiment, a network provider server 170 operates to generate scheduling of the wireless communication between the base stations 140, 190 and the hub 110 through wireless links 115, 116. For an embodiment, the network provider server 170 may access a database 160 of, for example, a network management element 150, aid in generating the scheduled communication, and provide the scheduled communication to the base stations 140, 190. For an embodiment, the base stations 140 include modems 145, 192 and the hub 110 includes modem 130, for enabling the wireless communication between the base stations 140, 190 and the hub 110.

For an embodiment, the network server 170 provides the hub 110 with data profiles 121, 122, 123 for controlling the reporting of data of the data sources 111, 112, 113. A controller 132 of the hub 110 may manage the data reporting of the data sources 111, 112, 113 as specified by the data profiles 121, 122, 123.

For satellite systems, the wireless link 115 through a satellite 195 can be very long. Accordingly, the propagation delays of wireless communication between the hub 110 and the base station 140 of the satellite network can be very long. Further, the propagation delay can vary with time.

Satellite motion and a large cell size of satellite beams creates situations in which there are both a large mean RTT (round trip time) (~512 ms) and also a large variation of the RTT (~+-4 ms over 24 hrs). The long-term motion of a satellite is not indefinitely predictable and may even incur sudden changes in position from station keeping activities. For example, a satellite may maintain its orbital position by using onboard thrusters to keep its current stationed position. Due to these reasons, a UE (user equipment) or hub requires a live and dynamic means to independently determine the one-way delay (propagation delay) between itself and the base station. For an embodiment, RTT is computed as twice of estimated one-way (propagation) delay.

It is to be understood that synchronization between communicating devices is critical to maintaining wireless communication between devices, such as, a first node and a second node, or a base station and a hub. The large variable propagation delays between the devices may inhibit the ability to maintain synchronization between the devices. For at least some embodiments, having well characterized (well estimated) propagation delay allows the latency of the wireless communication system (including first node and the second node) to be reduced.

Many wireless systems include a timing "slush fund" to match the timing uncertainty of the wireless system. The described embodiments for estimating the propagation delay can be used to reduce the timing uncertainty, and therefore, maintain the timing of wireless communication within the slush fund. Other related systems, such as high-frequency trading can also benefit from controlling system latency, and to do that these systems need to maximize propagation time characterizations. For at least some embodiments timing slush funds consume network resources which could have been used for actual application data, which can reduce network throughput. As will be described, the estimations of the propagation delay can allow the utilization of virtual preambles, as will be described, reduces the demands on the resources (frequency spectrum) needed by the wireless system.

Figure 2:
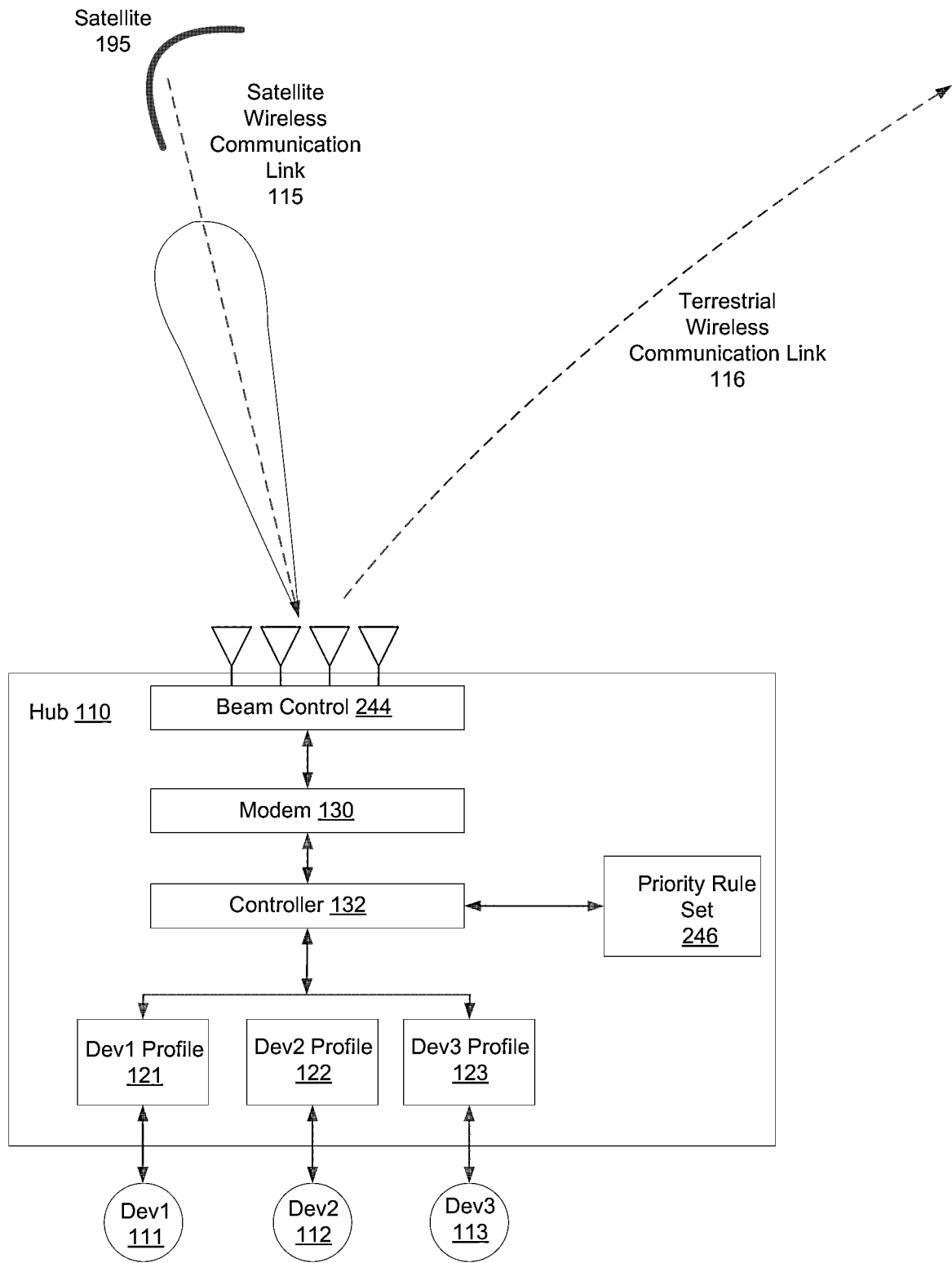
FIG. 2 shows a hub connecting to either a satellite network or a terrestrial network based on a priority rule set, according to an embodiment.

FIG. 2 shows a hub 110 connecting to either a satellite network or a terrestrial network based on a priority rule set 246, according to an embodiment. That is, the priority rule set 246 provides conditions for selecting either the satellite network or the terrestrial network, and the hub 110 then connects to the selected network. The hub 110 includes a beam control 244 which controls beam forming parameters of a plurality of antennas (antenna array) of the hub 110. The beam forming parameters control at least a direction of one or more beams formed by the plurality of antennas. For an embodiment, the beam forming parameters include controlling at least a phase of signals communicated through the plurality of antennas.

For an embodiment, the priority rule set 246 includes a type of data traffic of an application operating on the hub 110 or a data device 111, 112, 113 connected to the hub 110. For example, the rule set 246 may include a selection of the satellite network or the terrestrial network based on a latency sensitivity of the data traffic. Further, the rule 246 set may include a selection of the satellite network or the terrestrial network based upon a size or amount of data of the data traffic. For at least some embodiments, the data may have latency or time response requirements. For example, based upon latency, an election may be made to utilize IP-based traffic and modern protocols (for example, HTTP (Hyper-Text Transfer Protocol)) which have strict latency requirements which may not be met connecting through a satellite link to a satellite network, and accordingly, the terrestrial network may be selected.

For an embodiment, the rule set 246 may include a selection of the satellite network or the terrestrial network based on a desired or required level of security of the data to be communicated. For an embodiment, at least one of the satellite network or the terrestrial network may provide a higher level of security. For example, a private satellite network using single or multiple base stations may provide a highly secure network to an entity over a large geographical region, and therefore, selection of the satellite network may be driven at least in part on a level of security needed for the wireless communication.

For an embodiment, the rule set 246 may include a selection of the satellite network or the terrestrial network based on network conditions. For an embodiment, this includes determining if an error rate is above a desired threshold, a latency is greater than a desired threshold, and/or a capacity is less than a desired threshold for either the satellite network or the terrestrial network, and selecting the satellite network or the terrestrial network in order to satisfy one or more of the desired thresholds. For an embodiment, the network conditions are determined before an initial selection of the satellite network or the terrestrial network. For an embodiment, the network conditions are monitored, and a switch from a one of the satellite network or the terrestrial network to the other of the satellite network or the terrestrial network is made based on the monitored conditions For an embodiment, the rule set 246 may include a selection of the satellite network or the terrestrial network based on a location of the hub 110. For an embodiment, this is more than a selection being made because of the availability or lack of availability of the satellite network or the terrestrial network. That is, for example, for an embodiment the selection of the satellite network or the terrestrial network based on a location of the hub is influenced or determined by regulatory requirements. For example, some frequency ranges for wireless communication may be permitted in certain geographic areas but not in other geographic areas. Some geographic areas might have restrictions on the transmit power level by hub. There can be some restrictions on roaming services by government bodies.

For an embodiment, the rule set 246 may include a selection of the satellite network or the terrestrial network based on bandwidth requirements of the data to be communicated by the hub 110. That is, one of the satellite network or the terrestrial network may have more available bandwidth.

For an embodiment, the rule set 246 may include a selection of the satellite network or the terrestrial network based on firmware updates. For an embodiment, the satellite network is selected in part due to firmware updates when a large number of hubs need to be simultaneously updated. The satellite network typically covers a much larger area than a single terrestrial network. Therefore, when updating hubs that are spread over a large geographical region, an embodiment includes broadcasting the firmware update over the satellite network to the hubs. Firmware updates over the air may require large amounts of data to be communicated to multiple devices simultaneously, and it can be useful to use satellite coverage over a large area using a simultaneous broadcast or multicast of the data.

For an embodiment, the rule set 246 may include a selection of the satellite network or the terrestrial network based on diagnostic logs. For an embodiment, the hub(s) send (wirelessly transmit) diagnostic logs to an upstream server periodically. For at least some embodiments, the diagnostic logs are bigger in size (include large amounts of data) and are a low priority. Therefore, for an embodiment, the diagnostic logs are wirelessly transmitted to an upstream network using the one of the satellite or the terrestrial network which is less congested and less expensive.

For an embodiment, the rule set 246 may include a selection of the satellite network or the terrestrial network based on contention within the satellite network or the terrestrial network. That is, one of the satellite network or the terrestrial network may have many connecting devices contending for resources of the corresponding network. Accordingly, the rule set may drive a selection to the other of the satellite network or the terrestrial network which may have fewer devices contending for its resources.

For an embodiment, the rule set 246 may include a selection of the satellite network or the terrestrial network based on signal quality of the satellite network or the terrestrial network. For example, the hub may select the network that provides the highest signal quality or a signal quality better than a threshold, wherein signal quality may include signal strength, SNR, SNIR, packet. For an embodiment, the signal quality threshold is different for the terrestrial than for the satellite network.

For an embodiment, the rule set 246 may include a selection of the satellite network or the terrestrial network based on a preference. That is, the hub 110 may prefer a one of the satellite network or the terrestrial network, and switch to the other when the preferred network is not available.

For an embodiment, the rule set 246 may include a selection of the satellite network or the terrestrial network based on cost.

For an embodiment, the rule set 246 may include a selection of the satellite network or the terrestrial network based on power optimizations and a hub battery level. For example, when the battery level of the hub 110 is below a threshold and the hub is not connected to a power source, then terrestrial network can be preferred over satellite.

For at least some embodiments, after the hub 110 has selected to connect to one of the satellite network or the terrestrial network based on a priority ruleset, the hub 110 estimates a propagation delay between the hub 110 and a base station of the satellite network when the satellite network is selected. At least some embodiments for estimating the propagation delay will be described.

For at least some embodiments, after estimating the propagation delay, the hub 110 adjusts a frame offset between transmit radio frames and receive radio frames based on whether the satellite network or the terrestrial network is selected, and the hub adjusts a transmit timing correction based on the estimated propagation delay and the adjusted offset between transmit radio frames and receive radio frames.

Further, for at least some embodiments, the hub 110 communicates with the base station of the satellite network when the satellite network is selected, and with a base station of the terrestrial network when the terrestrial network is selected, and the hub 110 connects to the selected one of the satellite network or the terrestrial network.

Figure 3A:
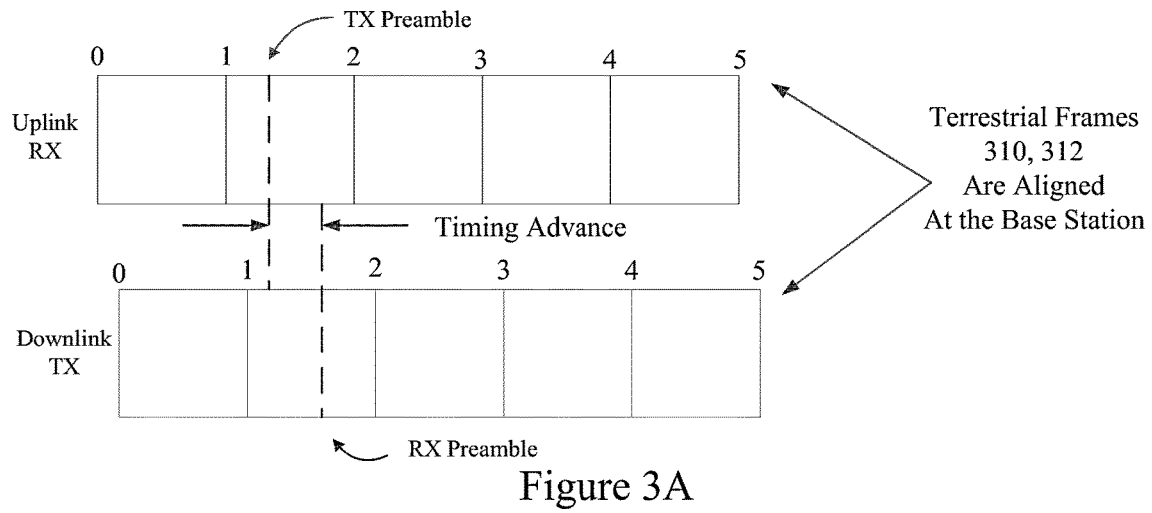
FIG. 3A shows uplink frames and downlink frames of terrestrial wireless communication frames, according to an embodiment.

FIG. 3A shows uplink frames 310 and downlink frames 312 of terrestrial wireless communication frames, according to an embodiment. As shown, for terrestrial wireless communication uplink frames 310 are aligned with the downlink frames 312 at the base station. That is, an Nth uplink frame 310 time aligns with the Nth downlink frame (subframe) time 312 at the base station. For a terrestrial network, a propagation delay between base station and hub is less than the length of a subframe or frame. For an embodiment, the hub adjusts a transmit timing of the uplink transmissions using a 'timing advance' to meet timing requirements at base station. For an embodiment, the timing advance is provided by the base station to hub as defined in the 3gpp (3rd Generation Partnership Project) specification and the timing advance depends on the propagation delay between base station and hub. According to the LTE (long term evolution) standard, a subframe is of 1 millisecond duration.

Figure 3B:
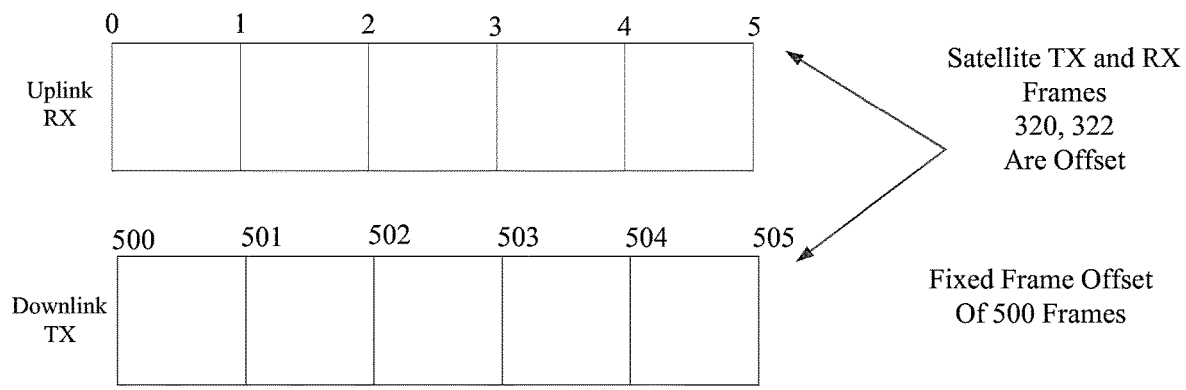
FIG. 3B shows uplinks frames and downlink frames of satellite wireless communication frames at a base station, according to an embodiment.

FIG. 3B shows uplinks frames 320 and downlink frames 322 of satellite wireless communication frames at a base station, according to an embodiment. As shown, due to the large (long) propagation delay between the hub and the satellite network base station, the uplink TX frames 320 are offset from the downlink RX frames 322. As previously described, for an embodiment, the hub adjusts a timing offset between transmit radio frames and receive radio frames based on whether the satellite network or the terrestrial network is selected. That is, when the satellite network is selected, the hub adjusts the timing offset such that the uplink frames 320 and downlink frames 322 at the base station are offset by a fixed frame offset. As shown in FIG. 3B, for example, the frame 1 of the uplink frames 320 is aligned with the frame 501 of the downlink frames 322. For an embodiment, the fixed frame offset is selected based on the estimated propagation delay.

For an embodiment, for the satellite network, uplink and downlink frames are defined such that uplink frames are the 'fixed frame offset' behind the downlink frames. For example, when the fixed frame offset between downlink and uplink frame is 500, then the Nth uplink frame aligns with the N+500th downlink frame at the base station. For an embodiment, the fixed frame offset is at least as long as the estimated maximum propagation delay between base station and hub over the satellite network.

For an embodiment, including the fixed frame offset between the uplink and downlink frames, enables using the NBIOT (narrow band, internet of thing) protocol for the satellite network. Accordingly, for an embodiment, the NBIOT (narrow band, internet of thing) is used for both satellite and terrestrial wireless communication, and a common air interface (NBIOT) is used for both satellite and terrestrial wireless communication.

As previously described, for an embodiment, the hub adjusts a timing offset between transmit (uplink) radio frames and receive (downlink) radio frames based on whether the satellite network or the terrestrial network is selected or the fixed-frame offset broadcast by the base station. That is, when the satellite network is selected, the hub adjusts the offset such that the TX (uplink) and RX (downlink) frames are offset such that a later RX (downlink) frame is aligned with an earlier TX (uplink) frame. As shown in FIG. 3B, for example, the frame 1 of the TX (uplink) frames is aligned with the frame 501 of the RX (downlink) frames. For an embodiment, the timing offset is selected based on the estimated propagation delay, and maintains the 'fixed frame offset' between uplink and downlink frames at the base station.

Further, for an embodiment, the hub adjusts a timing advance correction based on the 3gpp (3rd Generation Partnership Project) specification. For an embodiment, when the timing advance is available from the base station, the hub further adjusts the transmit timing correction based on a 'Timing advance' value. Further if the accuracy of a timing offset, dependent upon the accuracy of the propagation delay estimate calculated by the hub has a threshold level of accuracy the need for an additional timing correction via a timing advance mechanism is eliminated.

Figure 3C:
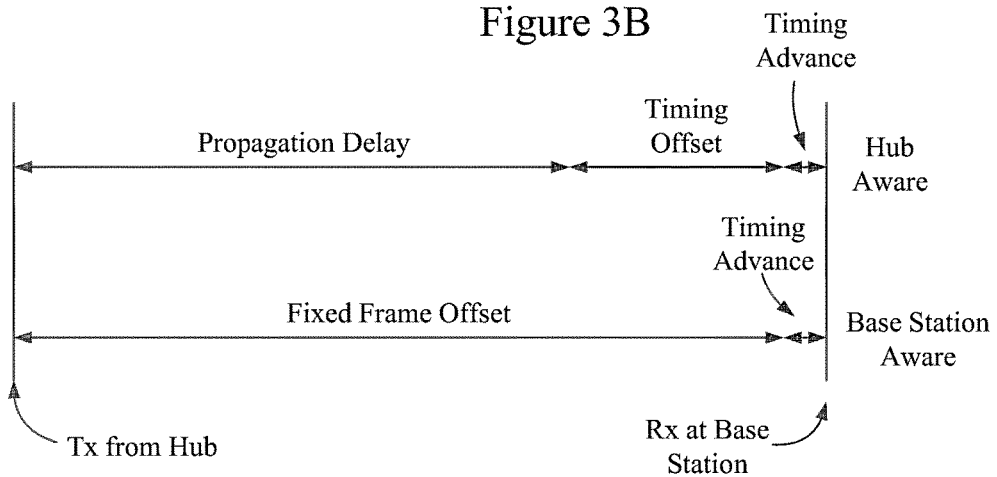
FIG. 3C shows a time-line of a propagation delay estimate of a satellite link, a timing offset, a fixed-frame offset, and a possible timing advance, according to an embodiment.

FIG. 3C shows a time-line of a propagation delay estimate of a satellite link, a timing offset, a fixed-frame offset, and a possible timing advance, according to an embodiment. For at least some embodiments, the fixed frame offset is set based upon an estimated maximum delay possible between any hub and the satellite network base station. The timing offset of FIG. 3C is a time that the hub holds back on transmitting frames that ensures that the frames of different hubs are received by the satellite base station at the same time, as specified by the fixed frame offset and their individual propagation delays. If the timing offset has enough precision, then the timing advance is not needed.

Figure 4:
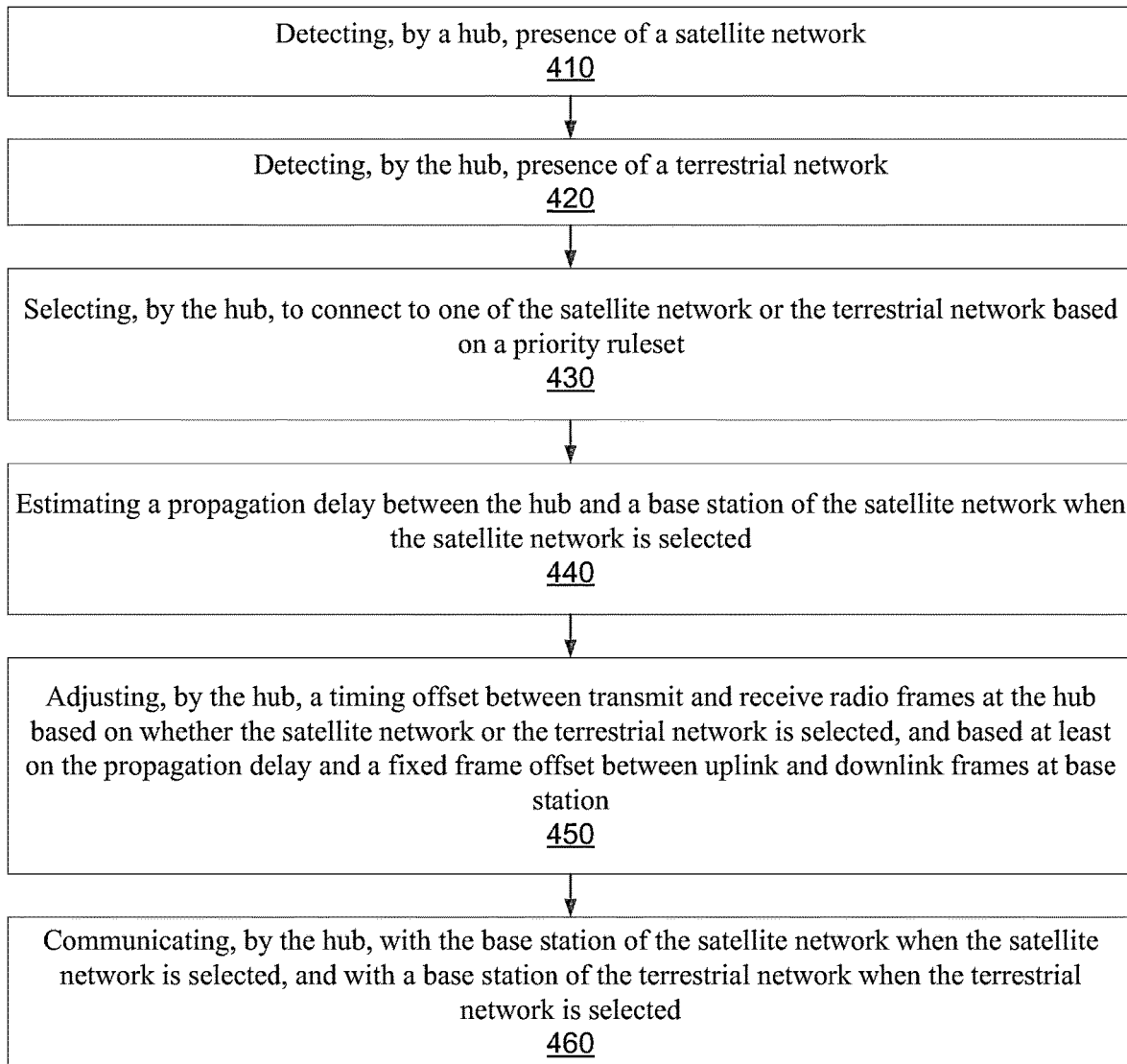
FIG. 4 is a flow chart that includes steps of a method of a hub selecting to connect to a satellite network or to a terrestrial network, according to an embodiment.

FIG. 4 is a flow chart that includes steps of a method of a hub selecting to connect to a satellite network or to a terrestrial network, according to an embodiment. A first step 410 includes detecting, by a hub, presence of a satellite network. A second step 420 includes detecting, by the hub, presence of a terrestrial network. A third step 430 includes selecting, by the hub, to connect to one of the satellite network or the terrestrial network based on a priority ruleset.

A fourth step 440 includes estimating a propagation delay between the hub and a base station of the satellite network when the satellite network is selected. A fifth step 450 includes adjusting, by the hub, a timing offset between transmit and receive radio frames at the hub based on whether the satellite network or the terrestrial network is selected, and based at least on the propagation delay and a fixed frame offset between uplink and downlink frames at base station. For an embodiment, the fixed frame offset is set at both the satellite network base station and at the hub. For an embodiment, the fixed frame offset is selected to be greater than a greatest possible propagation delay. For an embodiment, the fixed frame offset is provided by the base station to hub. For at least some embodiments, the fixed frame offset is referred as a predetermined maximum delay. A sixth step 460 includes communicating, by the hub, with the base station of the satellite network when the satellite network is selected, and with a base station of the terrestrial network when the terrestrial network is selected.

At least some embodiments, include broadcasting, by the base station, the fixed frame offset over the satellite network. The broadcast fixed frame offset can be received by a plurality of hubs which then utilize the broadcast fixed frame offset to facilitate wireless communication through the satellite of the satellite network.

An embodiment includes selecting the adjusted timing offset between the transmit radio frames and receive radio frames based on a predetermined maximum propagation delay between the hub and the base station of the satellite network, and the estimated propagation delay. For an embodiment, the fixed frame offset is based upon the maximum propagation delay between the hub and the satellite. This is uniquely required in order to use same air interface between the terrestrial and the satellite networks.

At least some embodiments further include configuring air interface communication protocol timer values, including a wait time for a response, and a contention resolution timer, based on the fixed-frame offset and estimated propagation delay. For example, when the hub transmits an uplink packet, including preamble to the base station and a response is required from the base station, the hub starts a timer to wait for the response from the base station. If a response is not received before timeout, the hub assumes that the packet failed and retransmits the packet. In order to enable communication over satellite, the timers are adjusted to accommodate higher satellite latency. Adjusting the fixed frame offset, timing offset, and the response wait time based on the estimated propagation delay allows connection to the satellite network and the terrestrial network using the common protocol and common air interface.

At least some embodiments further include adjusting a transmit power of the hub based on whether the satellite network or the terrestrial network is selected. For an embodiment, this includes adjusting or selecting the transmit power based on the estimated propagation delay. Further, for at least some embodiments, a modulation and coding scheme (MCS) of the transmitted signals is selected based on whether the satellite or terrestrial network is selected, the propagation delay, and/or an estimated SINR of communicated signals.

At least some embodiments further include selecting a RF (radio frequency) configuration of the hub based on whether the satellite network or the terrestrial network is selected. For an embodiment this includes selecting a frequency selective antenna configuration based on whether the satellite network or the terrestrial network is selected. For an embodiment, this includes selecting a beamforming antenna configuration when the satellite network is selected that includes a beam direction, or selecting an omnidirectional antenna configuration when the terrestrial network is selected. For an embodiment, this includes correspondingly adjusting the RF chain parameters including phase and amplitude to enable directional or omnidirectional communications. For an embodiment, this includes selecting a subset of hub antennas when the terrestrial network is selected, or selecting a higher gain antenna configuration when the satellite network is selected.

As will further elaborated, for at least some embodiments, estimating the propagation delay between the hub and at least one of the satellite network or the terrestrial network includes receiving, by the hub, from the satellite network or the terrestrial network a packet containing a first timestamp representing the transmit time of the packet, receiving, by the hub, from a local time source, a second timestamp corresponding with a time of reception of the first timestamp received from the hub, calculating a time difference between the first timestamp and the second timestamp, storing the time difference between the first timestamp and the second timestamp, calculating, by the hub, a predictive model for predicting the propagation time based the time difference between the first timestamp and the second timestamp, and estimating, by the hub, the propagation time between the hub and the satellite network or the terrestrial network at a time, comprising querying the predictive model with the time.

For at least some embodiments, when the estimated propagation delay is within an error estimate threshold, then further receiving, by the satellite network or the terrestrial network, one or more preambles from a set of one or more data sources of the hub during a scheduled time slot, receiving, by the satellite network or the terrestrial network, one or more virtual preambles from a network server during the scheduled time slot, wherein the one or more virtual preambles are associated with another set of one or more data sources of the hub, generating, by the satellite network or the terrestrial network, responses to the preambles and the virtual preambles, wherein the responses included scheduled time and frequency allocations for uplink communication from the set of one or more data sources and the other set of one or more data sources, and transmitting, by the satellite network or the terrestrial network, the responses to the set of one or more data sources and the other set of one or more data sources.

At least some embodiments further include periodically switching between the satellite network and the terrestrial network to scan for SIB (system information block) messages and to scan for the availability of the satellite network and the terrestrial network. At least some embodiments further include dynamically switching sim (subscriber identity model) profiles based on a hub ruleset, the SIB messages, and the availability of the satellite network and the terrestrial network. For at least some embodiments, this includes dynamically switching sim profiles based upon the hub ruleset and observed networks (SIB1 SIB2—System information block etc.). At least some embodiments further include using a same sim (subscriber identity model) profiles for both terrestrial or satellite network.

For at least some embodiments, the priority ruleset includes one or more of a type of data traffic to be communicated between the hub and at least one of the satellite network or the terrestrial network, latency or time response requirements, network conditions, wherein the network conditions include one or more of error rates, latency, or capacity of the terrestrial network and the satellite network, a location of the hub, or a calculated propagation delay and a broadcast fixed frame offset.

At least some embodiments further include scanning during sleep cycles, by the hub, non-active communication bands for preference of allowable channels, thereby maximizing time on a priority network, and minimizing network switching time.

At least some embodiments further include performing, by the hub, a doppler correction upon the satellite network upon sensing some conditions including sensing a rate of change of the estimated propagation delay.

For at least some embodiments, the priority ruleset is dynamically updated by a system server.

At least some embodiments further include balancing communication loads of a plurality of hub between the satellite network and the terrestrial network to reduce contention and optimum network usage.

Estimating the Propagation Delay of a Satellite Network

At least some embodiments include calculating a predictive model for predicting the propagation time. For at least some embodiments, the predictive model is calculated based on one or more of time differences between a first timestamp of a transmit time of a packet, and a second timestamp of the receive time of the packet. For an embodiment, the propagation time between the first node and the second node at a time is estimated by querying the predictive model with the time. Various embodiments additionally utilize other parameters in calculating the predictive model. For at least some embodiments, the predictive model adaptively changes over time.

Figure 5:
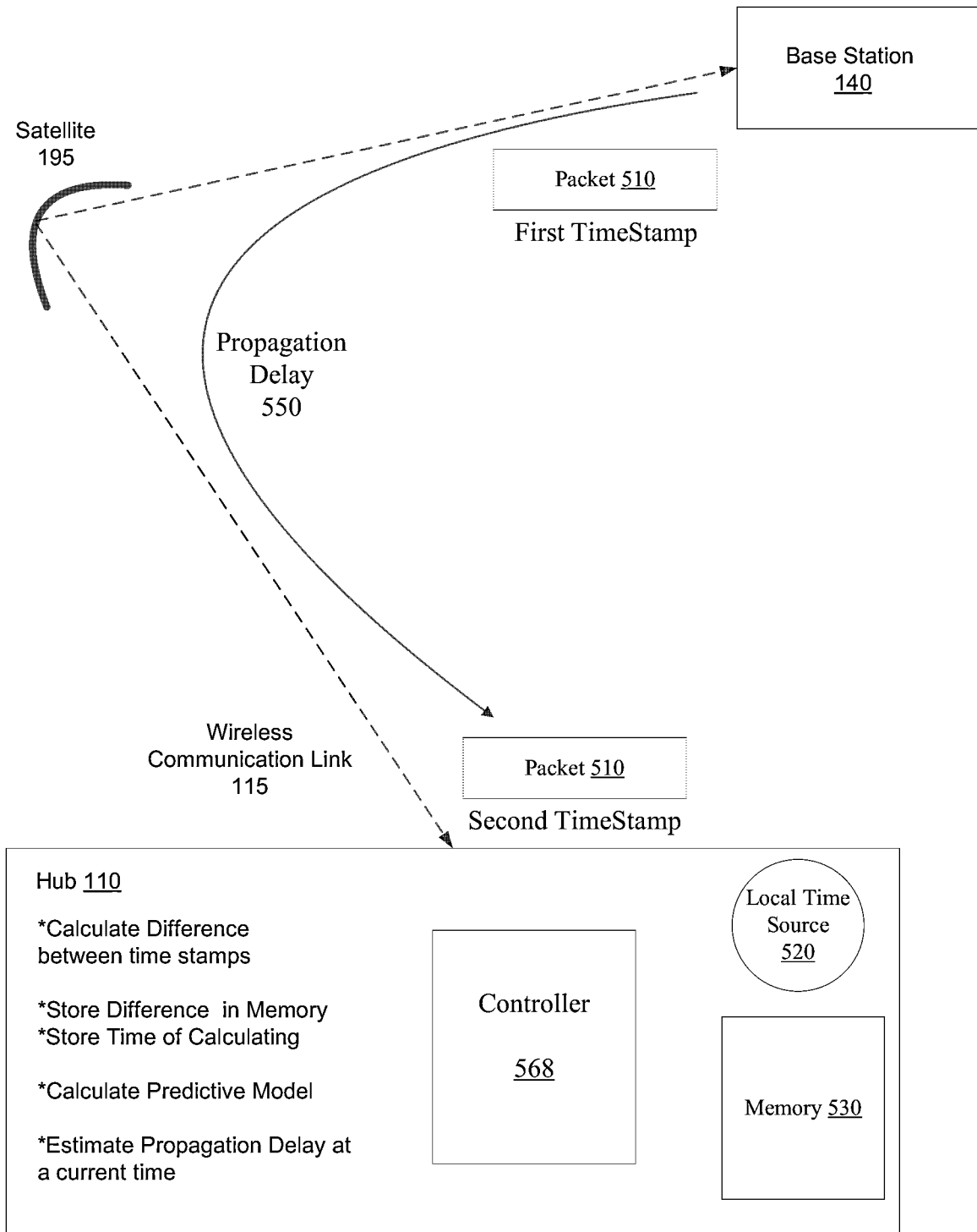
FIG. 5 shows a sequence of transmission of a packet between a base station and a hub, according to an embodiment.

FIG. 5 shows a sequence of transmission of a packet between a base station and a hub, according to an embodiment. The packet sequence allows for dynamic estimation of the propagation delay 550 between a first node (base station 140) and a second node (hub 110) of a wireless network.

As shown, a packet 510 is transmitted from the base station 140 to the hub 110. For an embodiment, a first time stamp is included within the packet 510 by the base station 140 that provides an indication of the transmit time of the packet 510 from the base station 140. The hub 110 receives the packet 510 and the first timestamp, and then generates a second time stamp based on the receive time of the packet 510 at the hub.

For an embodiment, the hub 110 receives the second timestamp from a local source 520 of the hub 110 that corresponds with a time of wireless reception of the first timestamp received from the base station 140. The local source 520 of FIG. 5 is shown as being internal to the hub 110, but the local source 520 does not have to be internal to the hub 110. For an embodiment, a controller 568 of the hub 110 operates to calculate a time difference between the first timestamp and the second timestamp. Further, the controller 568 operates to store the time difference between the first timestamp and the second timestamp in memory 530. For an embodiment, the controller 568 additionally stores a time of the calculating of the time difference.

For an embodiment, the process of receiving first timestamps from the base station is repeatedly performed over time, providing a large (long time) or continuous characterization of the propagation delay between the base station 140 and the hub 110. As will be described, for an embodiment, the first timestamp is estimated based upon the first received timestamp from the first node and based-upon forward integrating a counting signal received from the first node.

For an embodiment, a predictive model is calculated based on one or more of time differences between the first timestamp and the second timestamp. For an embodiment, the predictive model is additionally calculated based on the times of calculating one or more time differences. For at least some embodiments, calculating the predictive model and estimating the propagation time are two asynchronous events with respect to each other.

For an embodiment, the predictive model is used for predicting the propagation time at a present time, and/or at future times. An embodiment includes estimating the propagation time between the first node and the second node at a time (current or future) by querying the predictive model with the current (or future) time at the hub 110.

Figure 6:
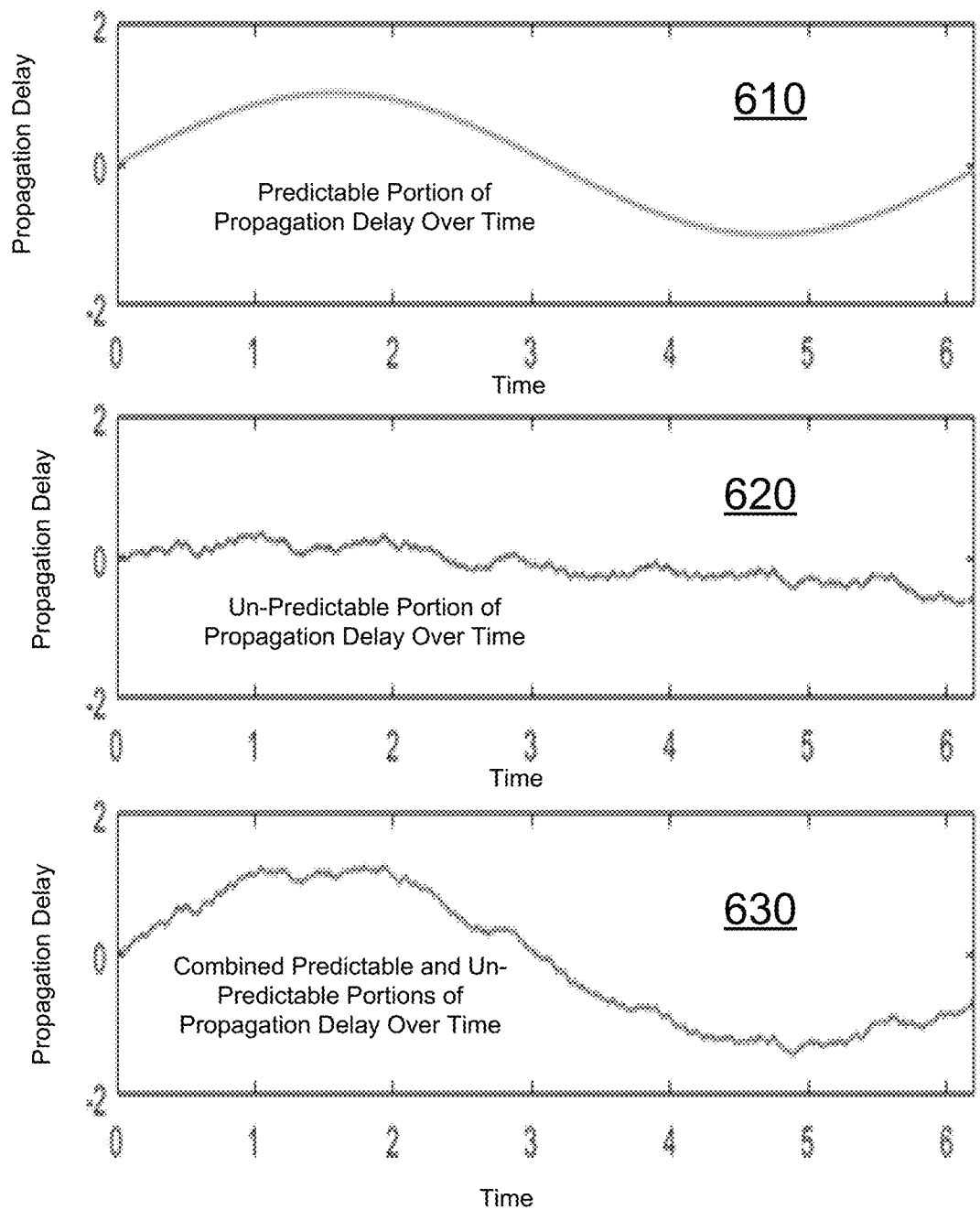
FIG. 6 shows examples of characteristics of the propagation delay, according to an embodiment.

FIG. 6 shows examples of characteristics of the propagation delay, according to an embodiment. As shown, a component 610 of the propagation delay may be well behaved and predictable. For example, the component of the propagation delay due to the travel time between the hub and the base station due to variances in the distance from the satellite will vary continuously. Further, as shown components 620 of the propagation delay are not continuous and predictable. These delays may be as a result, for example, of motion of the hub itself. The component 610 adds with the components 620 yielding a composite propagation delay 630 over time that includes both the predictable and the unpredictable propagation delays.

For an embodiment, the predictability of propagation delay between the first node and the second node is a function of the frequency of new information being injected into a prediction model. For example, if the system dynamics result in a slowly changing system (that is, slowly changing propagation delay), the model is accurately predictable for lower frequency injections of new pieces of information. The validity/predictability of the propagation delay prediction model is proportionally related to the new information frequency and the rate of change of the system dynamics.

For at least some embodiments, the sampled data injected into the prediction model is 2-dimensional, including the calculated time difference between the first timestamp and the second time stamp, and the time of the calculation of the time difference. The purpose of the two-dimensionality is to accommodate for variance and uncertainty in periodicity of information injection into the propagation delay prediction model. For example, the prediction model may receive 5 consecutive samples, wherein new information is injected every 10 seconds, and for the $6^{th}$ instance there is a 20 second gap.

The internal (predictive) model could take on a number of different forms depending upon the system dynamics in which it is describing. Some models are better suited than others for different real-world systems. Accordingly, at least some embodiments include adaptively selecting a base model based on characteristics of the first timestamp and the second time stamp, and/or other information available related to the propagation delay between the first and second nodes.

For an embodiment, the predictive model is as simple as a constant model or passthrough model. For at least some embodiments, queries of the predictive model give that last received time difference.

Depending upon the time number and how recently the time difference calculations are available, the order of the model (that is, how many derivatives or higher power terms) may dynamically vary. In one instance, when a model is first initiated and only one data point is available, the model may utilize a zeroth order estimation technique, however as additional data points become available $1^{st}$, $2^{nd}$ and $3^{rd}$ order terms may be utilized to increase the fidelity of the predictive model and to increase the time-period of validity of the predictive model by capturing higher-order system dynamics. For an embodiment, the frequency of data sampling and model updating can also allow more of the underlying system dynamics to be captured and modeled. This is very much related to Nyquist frequency.

In practicality it is often not easy to know (by the hub) what network time (what time the base station thinks it is). As previously described, wireless communication between the hub and the base station through the wireless link demands synchronization of the hub with the base station. In reality it is not desirable to receive a new timestamp from the base station every X seconds. An embodiment includes the second node (hub) receiving one or more first time timestamps from the base station once, or very infrequently. For an embodiment, the hub then uses well characterized and non-divergent discrete networking timing increment "ticks" to forward integrate network time. For an embodiment, the discrete "tick" comes in the form of the current operating frame number of the system. The challenge is that the frame number can be ambiguous because frame numbers are cyclical (that is, 1 2 3 4 5 . . . 1 2 3 4 5).

For an embodiment the discrete network counting ticks include cyclical frame counters, for this embodiment the first timestamp is estimating by selecting from a group of possible cycle counts a value which produces a propagation time that is within a predefined acceptable value range. Given an expectation around propagation time, there exists a unique solution for how many frame number cycles have occurred over a large, but finite, time period.

Figure 7:
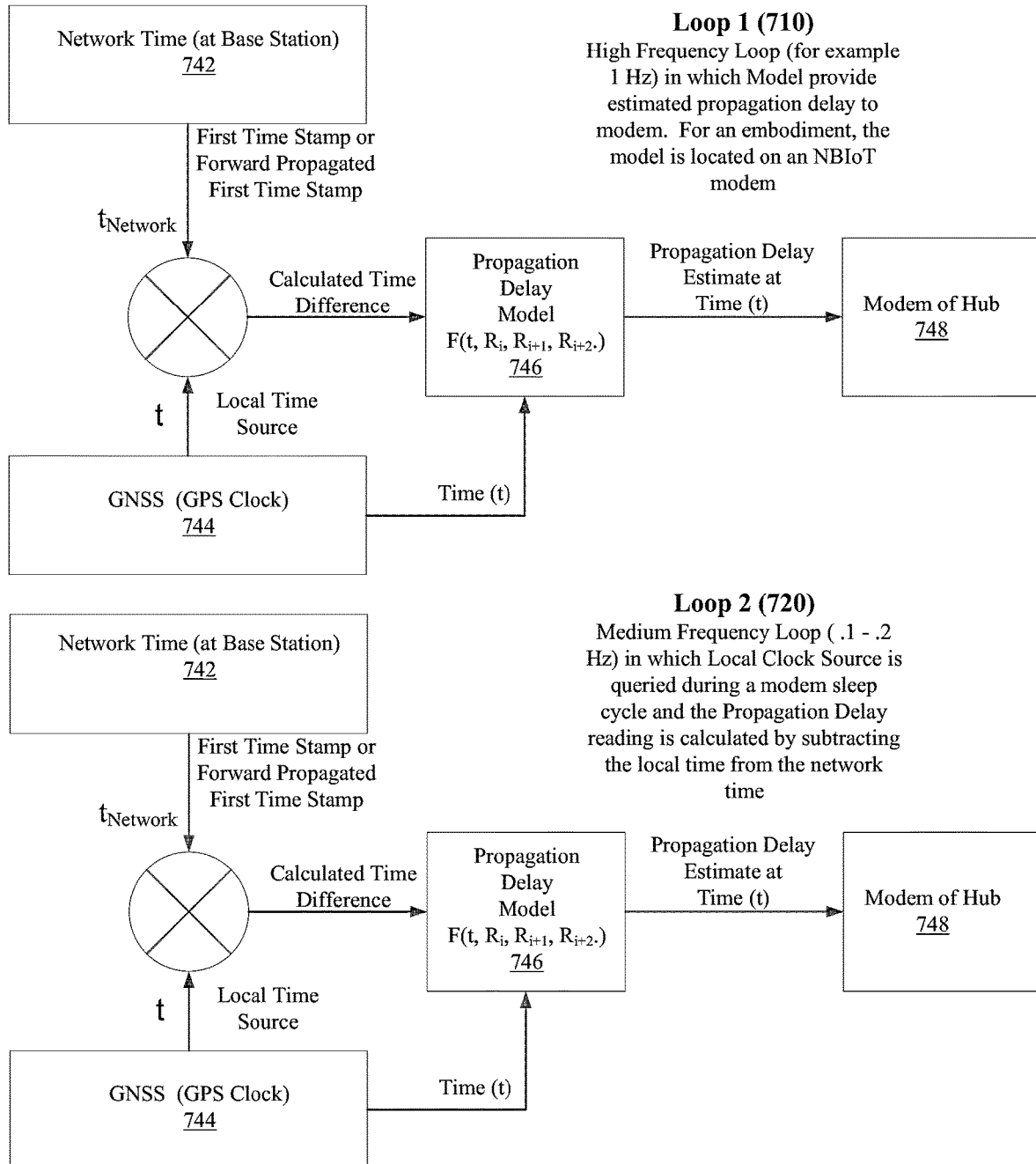
FIG. 7 shows a predictive model for estimating the propagation delay, according to an embodiment.

FIG. 7 show a predictive model of two different control loops 710, 720 for estimating the propagation delay, according to an embodiment.

Predictive Model(s)

Due to the large RTT (propagation delay) drift (up to ~1.2 μs/s) a new RTT must be calculated and sent to the modem of the second node (hub) at a frequency high enough to allow adjustment for drift of the propagation delay between the first node (base station) and the second node (hub). This can place a large burden on the requirement and availability of a GNSS (Global Navigation Satellite System) receiver of, for example, the hub. However, estimation of the RTT drift can be simplified due to the well-behaved and characterizable motion of the satellite within the wireless link between the first node (base station) and the second node (hub).

FIG. 7 shows an embodiment of a nested loop model for RTT calculation (Loop1). For an embodiment, the exterior loop 710 consists of time differences ($R_i$) being calculated by taking the difference between the Network Time 742 (at the first node or base station) and Local Time 744 (at the second node or hub) during an NB-IoT (Narrow Band Internet of Things) modem sleep cycle. For an embodiment, this time delta $R_i$ is sent to a local primitive RTT model 746 (that is, the propagation delay predictive model). For an embodiment, the RTT model 746 provides an equation for the RTT based upon the current GNSS time (0.5 ppm→1 ppm clock drift poses negligible accuracy concerns as an input to the RTT model 746) and a series of the i most recent time deltas. The inner loop 720 consists of the RTT model (executed on NB-IoT chipset) pushing a new RTT to the modem every <1 second. A key observation of this method is that new RTT values can be sent to the modem without the modem going into sleep modem. There is still a freshness requirement on the RTT model which requires new GNSS readings on a periodic basis, but the inclusion of the model reduces the overall sample frequency requirement of the local GNSS and disconnects taking GNSS readings with updating the RTT.

For an embodiment, the modem of the second node (hub) 748 and the GNSS receiver of the second node utilize the same antenna and RF chain within the second node.

For an embodiment, the UE (user equipment) or hub or second node performs a $R_t$ (difference between the first timestamp and the second timestamp) measurement using a GNSS timestamp and network time available from SIB16 and frame counter. For an embodiment, the UE requires c-DRX (3GPP Defined sleep modes) and e-DRX sleep mode (to enable cohabitation between a GNSS receiver and a modem using the same RF chain to support a GNSS measurement. For an embodiment, the frequency of the $R_t$ measurements depends on the sleep cycle. A required sleep duration<10.24 s. (A short sleep cycle is desirable, because sleep cycle duration adds latency to any communications sent across the network. However, the sleep cycle must also be long enough to accurately capture a GNSS reading).

For an embodiment, whenever a TA (timing advance) correction is available from the base station, it should be used to correct the measured delay, in addition it can be used to adjust the frequency of Loop1 710 or loop 2 720 of FIG. 7.

For an embodiment, the RTT (propagation delay) is calculated using the predictive model based upon a finite and limited series of previous $R_t$ measurements. For an embodiment, the predictive model produces an RTT output given an input of current GNSS time. For an embodiment, this process occurs at a high frequency cycle (1 Hz) and can occur even when the modem is not in sleep mode.

Figure 8:
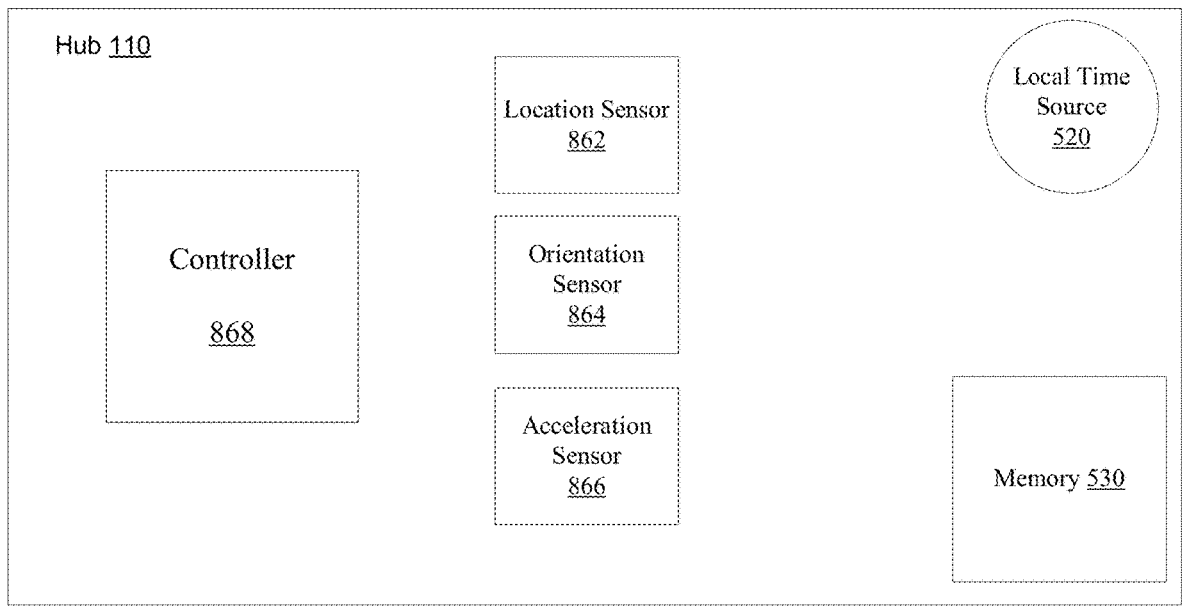
FIG. 8 shows a wireless system that includes a hub that includes external sensor observations including one or more of location, orientation, acceleration, and other spatial/momentum sensors that aid in estimating the propagation delay, according to an embodiment.

FIG. 8 shows a wireless system that includes a hub that includes external sensor observations including one or more of location, orientation, acceleration, and other spatial/momentum sensors that aid in estimating the propagation delay, according to an embodiment. Here, a hub 110 includes a controller 868 receiving sensor input, such a, a location sensor 862, an orientation sensor 864, and/or an acceleration sensor 866.

At least some embodiments include additional information as inputs for generating the predictive model for predicting the propagation time. That is, in addition to calculating the predictive model based on one or more of time differences between the first timestamp and the second timestamp, other parameters, such as, location or accelerometer data may be utilized. This is motivated in the satellite context, in that the rate of change of the propagation time is the summation of the well-behaved motion of the satellite and the poorly-behaved motion of the hub. The hub is poorly behaved because it introduces human-triggered system dynamics. For an embodiment, the motion of the hub may be captured by GPS information, and it may be captured by accelerometer dead-reckoning techniques. When this information is provided to the predictive model, sensor-fusion techniques can produce a more accurate output.

Figure 9:
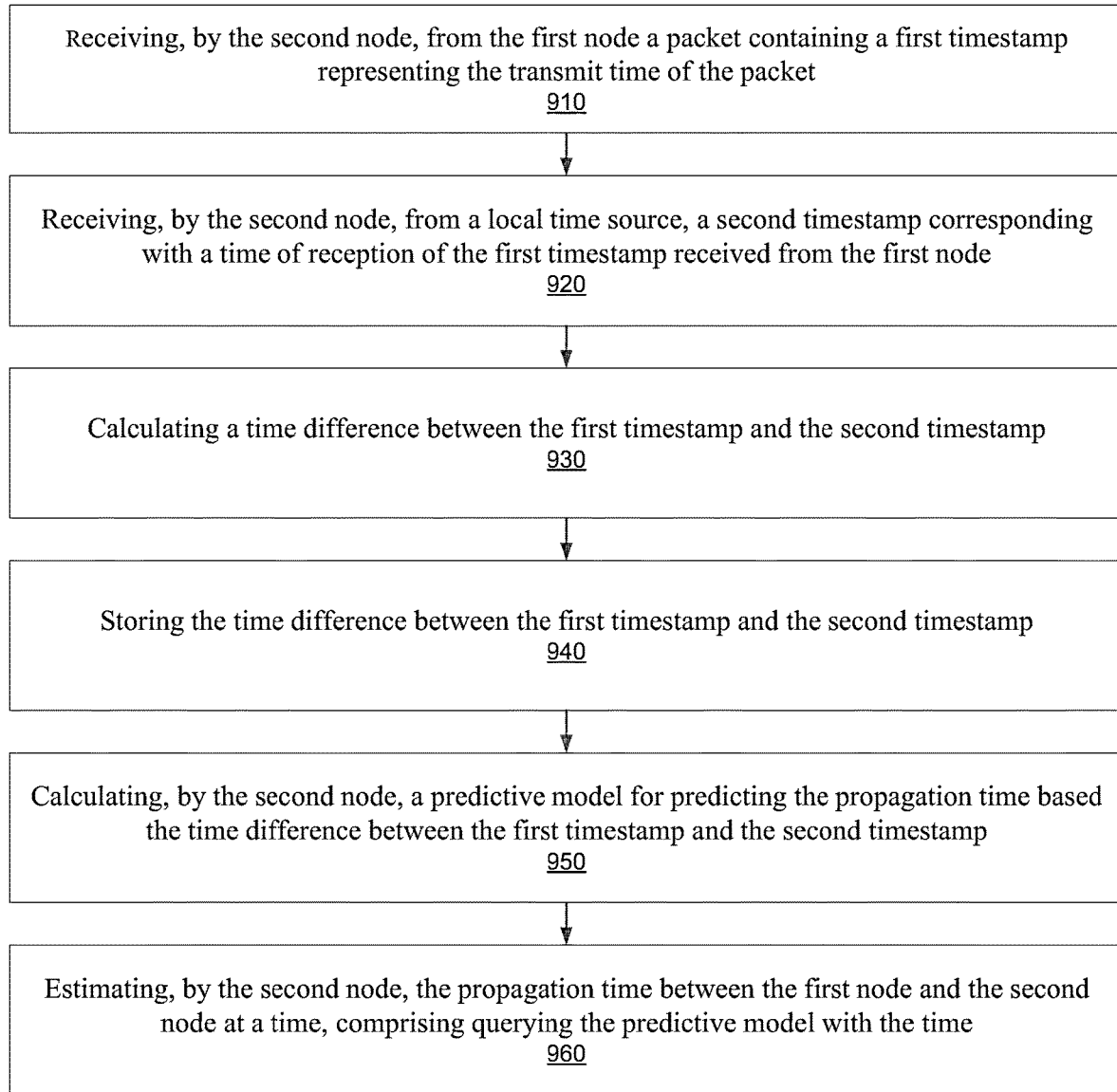
FIG. 9 is a flow chart that includes steps of a method of estimating a propagation time between a first node and a second node of a wireless network, according to an embodiment.

FIG. 9 is a flow chart that includes steps of a method of estimating a propagation time between a first node and a second node of a wireless network, according to an embodiment. A first step (a) 910 includes receiving, by the second node, from the first node a packet containing a first timestamp representing the transmit time of the packet. A second step (b) 920 includes receiving, by the second node, from a local time source, a second timestamp corresponding with a time of reception of the first timestamp received from the first node. A third step (c) 930 includes calculating a time difference between the first timestamp and the second timestamp. A fourth step (d) 940 includes storing the time difference between the first timestamp and the second timestamp. A fifth step (e) 950 includes calculating, by the second node, a predictive model for predicting the propagation time based on the time difference between the first timestamp and the second timestamp. A sixth step (f) 960 includes estimating, by the second node, the propagation time between the first node and the second node at a time (a current time or a future time), comprising querying the predictive model with the time.

At least some embodiments further include storing a time of the calculating of the time difference. Further, for at least some embodiments, calculating, by the second node, the predictive model is further based on the time of calculating the time difference. For an embodiment, the time difference calculation is performed at the second node (hub). However, time difference calculation can be performed at any node (location) that has access to both the first timestamp and second timestamp.

At least some embodiments include performing the performing steps a, b, c, d, N successive times for N packets, and calculating the predictive model for predicting the propagation time, based on time differences between the first timestamps and the second timestamps of each of the N packets. For an embodiment, the N packets are a running number of packets of a continuous series (could be infinite) of packets.

At least some embodiments include estimating, by the second node, additional first timestamps of additional packets based on the first timestamp, and forward integrating counter information provided by the first node.

That is, after receiving an initial first timestamp, additional first timestamps may be created at the second node. For an embodiment, the first node provides a count indicator that allows the second node to create first timestamps. For example, after the first completion reception of the first timestamp additional first timestamps from first node may be replaced by a different packet from first node representing a well-characterized counter, to allow the second node to calculate the additional first timestamps using forward integration methods. As an example, the first node sends a first timestamp to second node, but afterwards sends a 1 second tick indicator (current radio frame number). The second node then calculates an effective first timestamp in the future by taking the original first timestamp and adding the sum of the number of 1 second tick indicators to that timestamp.

As previously described, in order for the nodes (hub and the base station) to communicate, they must be synchronized. For an embodiment, the first node and the second node are locally phase synchronized to the same time source. For an embodiment, the first node and the second node are synchronized to GPS time.

For at least some embodiments, calculating, by the second node, the predictive model for predicting the propagation time based the time difference between the first timestamp and the second timestamp includes selecting a regression model base on a-priori information about characteristics including a cyclic nature of the propagation delay between the first node and the second node, and computing parameters of the regression model based on at least the time difference between the first timestamp and the second timestamp.

For an embodiment, the regression model is selected based upon a-priori information about the form/characteristics (that is, is the propagation delay time varying, cyclic in nature, and/or stochastic/deterministic) of the propagation delay between the first and second node. For an embodiment, the regression model is computed based on 1 to N available timestamp difference calculation data points. Further, for an embodiment, the regression model is computed based on the time(s) of the time difference calculation(s).

For an embodiment, the propagation delay predictive model is calculated based on, for example, two inputs (X,Y)→(Time of Difference Calculation, Difference Calculation Value). An exemplary predictive model selection includes first selecting an affine Regression model: Y=AX+B (A-prior knowledge dictated an affine model vs polynomial, etc). Secondly, solving for A and B based upon 1 to N available data tuples. Finally, the selected and calculated predictive model Y is queried by inputting a current or future X.

At least some embodiments further include identifying a time recent threshold between a time of a last time difference calculation and the time, wherein the time recent threshold is identified based on an estimated rate of change of system dynamics of the first node and the second node. That is, as time goes by, the predictive model may become stale and no longer provide accurate estimates of the propagation delay. The rate that the predictive model because stale or dated is dependent on the rate of change of the system (the first node and the second node communicating) dynamics.

For an embodiment, determining the rate of change of the system includes linearly estimating an error growth rate by comparing the model error as given by the timing advance correction to the elapsed time since the model was last updated. This error growth rate (which is the difference between the actual and modeled rate of change of the system) is then compared against the timing accuracy requirements of the system to produce a time period over which model estimations are valid, outside of this the model becomes stale.

For an embodiment, the error growth rate may also be estimated from historical readings/values, and the error growth may also be incrementally estimated based upon readings from the sensors such as accelerometer/GPS (location). That is, a stationary hub may have an error growth rate of X, when the hub is moving (which can be determined from sensors) and the error growth rate may be determined as X+Y.

As previously described, for an embodiment, the first node comprises a base station and the second node comprises a hub. Further, for an embodiment, a wireless communication link is formed between the base station and the hub. Further, for an embodiment, a satellite facilitates the wireless communication link between the base station and the hub.

As previously described, at least some embodiments further include the second node using the predicted propagation time to facilitate wireless communication between the second node and the first node by enabling synchronized reception timing of wireless communication from the second node to the first node. For an embodiment, synchronized reception timing of transmissions from second node to first node includes aligning radio frames.

For at least some embodiments, how frequently additional first timestamps and second timestamps are received by the second node is selected based on a determined error in estimates of the propagation delay. For at least some embodiments, the error in propagation prediction is calculated by internal network protocol timing fine correction schemes. In the case of LTE (long term evolution) this is a "Timing Advance". For at least embodiments, the predictive model is to solve for both coarse and fine timing. The network can naturally resolve fine timing if needed but cannot solve for coarse timing. However, it is desirable to the network to not have to solve for fine timing.

For at least some embodiments, how frequently additional first timestamp and second timestamps are received by the second node is selected based on at least one of user or hub-initiated commands and configurations, or an ephemeris of a satellite within a wireless link between the second node and the first node. For at least some embodiments, user or hub-initiated commands and configurations include, for example, a situation in which the hub is first turned on, and it is desirable to generate an accurate model as quickly as possible to reduce boot time. During this boot time the hub may instruct the system to increase the frequency of model updating to reduce latency. Once an adequate model is in place the hub may instruct the system to slow the rate of model updating to conserve resources. For at least some embodiments, the hub can also initiate changes based upon the previously described observed propagation error characteristics. Not all Geo-stationary satellites are stationary. Over the lifespan of a satellite it may drift in orbit or inclination increasing or decreasing its relative motion with respect to the first node and the second not as a function of time. With little relative motion the frequency of model updates can decrease and vice versa. For at least some embodiments, how frequently additional first timestamp and second timestamps are received by the second node is selected based on external sensor observations including one or more of location, orientation, acceleration, and other spatial/momentum sensors.

The propagation delay between two nodes in a satellite system changes at a rate which is the summation of the rate of change induced by motion in the satellite and the rate of change induced by motion of either of the nodes. When the nodes are stationary the system dynamics change more slowly and model updates can be calculated more slowly, when the nodes are in motion the system dynamics change more quickly and model updates must be performed more quickly.

For at least some embodiments, how frequently additional first timestamps and second timestamps are received by the second node is selected based on characteristics of transmitted data. Accurate propagation models are only required when the second not wants to send a message to first node. For an embodiment, known data transmission characteristics of the second node determine when these communications take place.

At least some embodiments further include selecting how frequently to estimate the propagation delay between the first node and the second node at additional times, and accordingly querying the predictive model with the future times based on a determined error in estimates of the propagation delay. The error estimates can be determined as previously described.

At least some embodiments further include selecting how frequently to estimate the propagation delay between the first node and the second node at additional times, and accordingly querying the predictive model with the future times based on at least one of user or hub-initiated commands and configurations, or an ephemeris of a satellite within a wireless link between the second node and the first node.

At least some embodiments further include selecting how frequently to estimate the propagation delay between the first node and the second node at additional times, and accordingly querying the predictive model with the future times based on external sensor observations including one or more of location, orientation, acceleration, and other spatial/momentum sensors.

At least some embodiments further include selecting how frequently to estimate the propagation delay between the first node and the second node at additional times, and accordingly querying the predictive model with the future times based on characteristics of transmitted data.

At least some embodiments further include updating the predictive model based on a determined error in estimates of the propagation delay.

At least some embodiments further include updating the predictive model based on at least one of user or hub-initiated commands and configurations, or an ephemeris of a satellite within a wireless link between the second node and the first node.

At least some embodiments further include updating the predictive model based on external sensor observations including one or more of location, orientation, acceleration, and other spatial/momentum sensors.

At least some embodiments further include updating the predictive model based on characteristics of transmitted data.

For at least some embodiments include the transmission of preambles from the second node to the first node. For at least some embodiments, the preambles are used to identify a desire to transmit data and to perform contention resolution if multiple nodes desire to transmit data at the same time. Further, for at least some embodiments, preambles are used to perform fine network timing correction.

As will be described, hub profiles allow for identification of a desire to transmit data to be eliminated and to effectively eliminate contention between multiple nodes. Further, the described propagation estimation processing can also eliminate the requirement to perform fine network timing. When both of these requirements are satisfied, preambles do not serve a required purpose and can be replaced with virtual preambles, resulting in a net increase in radio resources available for actually transmitting useful data.

Coarse vs Fine Timing

For an embodiment, a wireless system including a first node and a second node has a propagation delay time X. For an embodiment, the course timing is an estimate of X with error bounds +− Delta (a first estimate threshold). For an embodiment, the fine Timing is an estimate of X with error bounds +− Beta (a second threshold estimate), where Beta<<Delta. If the network has an estimate of X within +− Delta, it can naturally correct to an estimate of X within +− Beta using a timing advance correction. If the network does not have an estimate of X within +− Delta the network will not work and bi-direction communication breaks down. The described propagation delay predictive models provide methods which at a minimum provides an estimate of X within +− Delta, but also can provide an estimate of X within +− Beta, eliminating the requirement for the network to perform self-timing corrections, which is performed via sending preambles and receiving timing advance corrections. For at least some embodiments, estimates of the propagation delay within an error bounds between 0 and Beta allows for successful uplink transmission. Maintaining the estimation of the propagation delay by the predictive model within +− Beta (within the second estimate threshold) allows for the elimination of timing advance corrections. For at least some embodiments, a network server provides communication schedules to the devices (first and second nodes). If the timing advances corrections have been eliminated due to accuracy of the predictive model in estimating the propagation delay, preambles may be eliminated, and virtual preambles (to be described) can be used. The utilization of the virtual preambles is advantageous due to the reduction of the use of radio (wireless spectrum) resources.

For at least some embodiments, estimations of the propagation delays having an error bounds of between Delta (the first estimate threshold) and Beta (the second estimate threshold) include the use of preambles for uplink communication between the second node and the first node and virtual preamble cannot be used. For at least some embodiments, estimations of the propagation delays having an error bounds of less than Beta (the second estimate threshold) include the use of virtual preambles for uplink communication between the second node and the first node. As previously mentioned, utilization of virtual preambles is advantageous due to the reduction of the use of radio (wireless spectrum) resources.

Preambles and Virtual Preambles

The embodiments described include methods, apparatuses, and systems for reporting data of data sources. For at least some embodiments, when an error bounds of estimations of the propagation delay between a first node (base station) and a second node (hub) is less than an estimate threshold Beta (the second estimate threshold) the base station receives one or more preambles from a set data sources during a scheduled time slot and receives one or more virtual preambles from a network server during the scheduled time slot, wherein the one or more virtual preambles are associated with another set data sources. In response to receiving the preambles and the virtual preambles, the base station generates responses which are transmitted to the data sources, wherein the responses includes scheduled time and frequency allocations for uplink communication from the data sources. Once generated, the responses are transmitted by the base station to the data sources. For an embodiment, the base station generates an acknowledgement to a virtual preamble which is sent to the network server.

Referring back to FIG. 1, for an embodiment, the hub 110 generates a preamble when the hub 110 has data for uplink transmission to the base station 140. The preamble is transmitted through the wireless communication link 115 to the base station 140. The transmission of multiple preambles is according to the schedule that specifies at least time and/or frequency slots. The base station 140 then generates a response that includes frequency and time slot for transmission of uplink data, and unique preamble Id(s) (identification) for each of the preambles and each of the virtual preambles. For an embodiment, the base station 140 generates a response that includes frequency and time slot for transmission of uplink data, unique preamble Id(s) (identification) for each of the preambles and each of the virtual preambles, and scrambling codes. Hubs (including, for example, hub 110) then transmit the data to the base station.

The preambles are used to notify the base station of the need of an edge device (data device) to transmit data of the shared wireless communication links (such as, wireless communication link 115). For at least some embodiments, the preambles are temporally coordinated (scheduled) to eliminate collisions (wireless interference) during preamble windows (scheduled time slots).

It is to be understood that an optimal network design may not utilize scheduling of preamble. However, for operation within existing standards, the preambles and virtual preambles of the described embodiments are scheduled to allow operation within an existing frame work. In the existing system, preambles can be transmitted in any of the random access slots using any of the available preambles. However, through scheduling of the preambles, it is transmitted during specific random access slots controlled by the trigger function. In addition to that the trigger function can also define a preamble group from which the preamble can be chosen for transmission.

For at least some embodiments, the preambles include identifying information which correspond to a resource size allocation of the scheduling of transmissions through the shared wireless communication links. For at least some of the described embodiments, preambles are communicated to the base station 140 over orthogonal frequencies over the air, whereas the virtual preambles are communicated to the base station 140 from the network server through an electronic network. For at least some embodiments, the virtual preambles include the same information as the over-the-air preambles.

For at least some embodiments, the virtual preambles are provided to the base station 140 temporally coordinated with the coordinated (scheduled) transmission of the preambles. That is, the virtual preambles are communicated to the base station from the network server during the same preamble window as the preambles are wirelessly communicated from the hubs (such as, hub 110) to the base station. Essentially, the base station is "spoofed" into treating the preambles and the virtual preamble the same way. The virtual preambles need to be provided to the base station 140 using the same timing as the preambles. An external application operating on, for example, the network server 170 operates to ensure the timing of the virtual preambles is correct. For an embodiment, the network server provides the virtual preambles to the base station prior to the scheduled slot along with the timing information which allows the base station to interpret the virtual preamble at the time of scheduled slot. That is, the virtual preamble is provided to the base station before the scheduled time slot, but the base station is provided with additional timing information that allows the base station to interpret the virtual preamble at the time of scheduled slot.

It is to be understood that the preambles are transmitted "over the air" and accordingly, occupy valuable available frequency spectrum. Accordingly, the number of preambles that can be allocated may be limited to the number of subcarrier frequency resources available. However, virtual preambles are communicated to the base station electrically and do not use any frequency spectrum because they are not transmitted "over the air".

For at least some embodiments, other than reception of a virtual preamble rather than a preamble, the interactions between the base station and the hub are the same for both preamble and virtual preambles. For at least some embodiments, the base station responds back to the network server upon the reception of a virtual preamble—in acknowledgement of reception of the virtual preamble.

For at least some embodiments, the implementation and use of the virtual preamble reduces the data traffic through the shared wireless communication links 115, 116 because the virtual preambles are not communicated to the base station 140 through the shared wireless communication links (such as, wireless communication link 115). This is particularly beneficial when a large number of data devices are reporting data through the shared wireless communication links to the base station 140. The utilization of virtual preamble reduces the number of preambles transmitted, and accordingly, reduces network overhead. The use of virtual preamble reduces the number of preambles transmitted, and accordingly, allows more frequency spectrum to be utilized communicating data.

For an embodiment, the network server 170 generates a data profile (or hub profile) (121, 122, 123) for each of the hubs. For example, the server 170 generates the data profile that the base station 140 provides to the hub 110. For an embodiment, the data profile (or hub profile) (121, 122, 123) for the hub 110 correspond with devices 111, 112, 113 which are connected to the hub 110.

For an embodiment, the data profile includes a periodicity, an offset (timing offset), and a carrier frequency based on the scheduled communication. For an embodiment, the hub utilizes the periodicity, the offset, and the carrier frequency of its data profile for determining when and at what carrier frequency to transmit uplink wireless communication to the base station 140. For at least some embodiments, the data profile includes virtual preamble ID. For at least some embodiments, the data profile includes preamble IDs. For at least some embodiments, the preamble IDs includes preamble ID groups, wherein an ID group includes multiple usable IDs for the hub.

For example, the data profile may specify a periodic data transmission once every 5 minutes, with an offset, which may be represented in the data profile as: 5.05/5.03. Alternatively, periodicity can be defined in terms of a prach (physical random access channel) window. For an embodiment, a prach window is a time slot reserved for either a preamble or a virtual preamble. For an embodiment, a number of prach windows may be timing between two consecutive triggers. The offset can be defined as first prach index in a NBIOT (narrow band, internet of thing) hyperframe cycle.

For an embodiment, the base station 140 then receives uplink wireless communication from each of the plurality of hubs according to the data profile of each of the hubs and according to the scheduled communication. For an embodiment, the hubs use the data profiles for determining when to transmit, and the base station 140 uses the scheduled communication to determine when to receive the uplink wireless communication.

As shown, for an embodiment, the uplink wireless communication is transmitted by plurality of hubs and received by the base station through a satellite wireless link via a satellite 195. As described, for at least some embodiments, the hub includes the data source.

Figure 10:
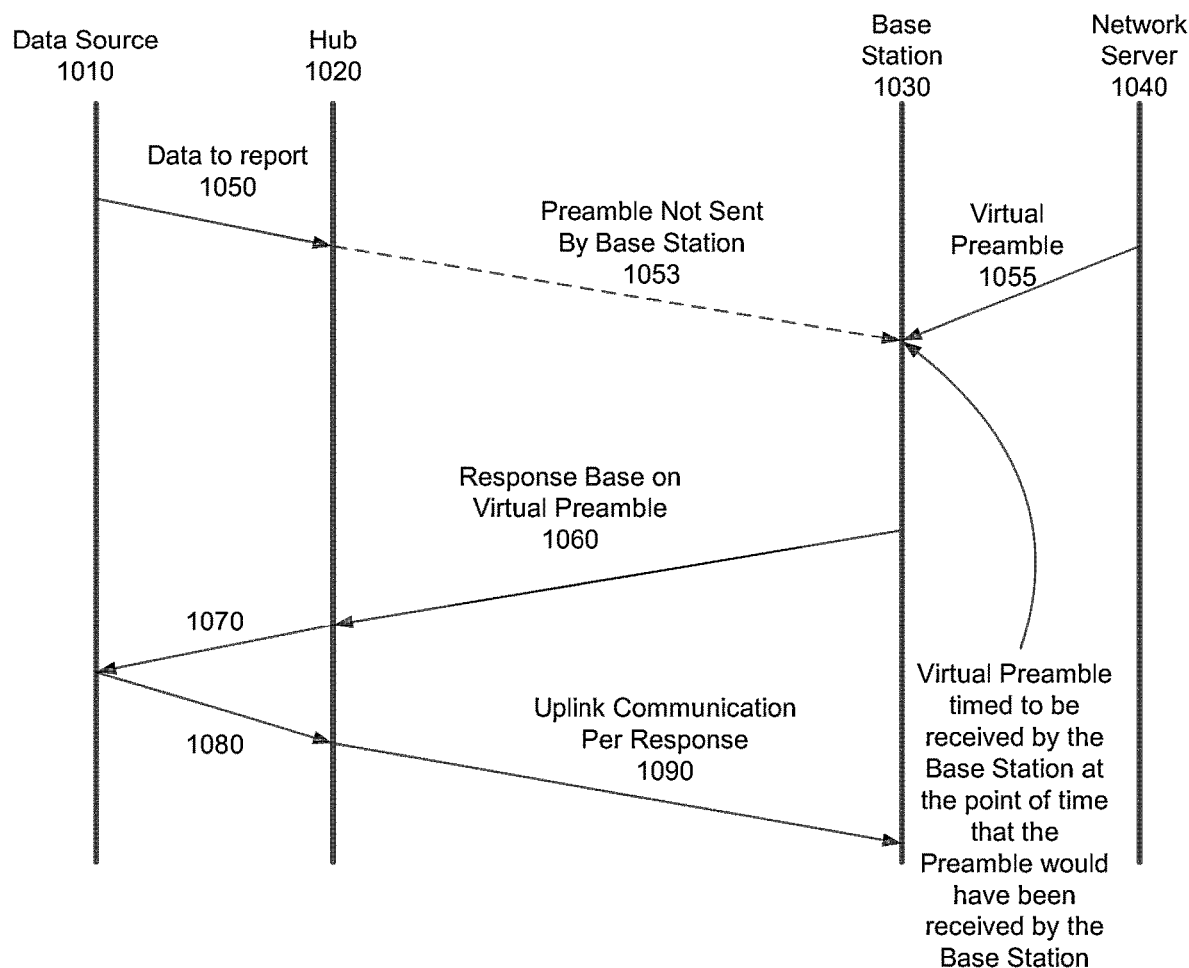
FIG. 10 shows a time-line of interactions between a data source, a hub, a base station and a network server, according to an embodiment.

FIG. 10 shows a time-line of interactions between a data source, a hub, a base station and a network server, according to an embodiment. As shown, a data source 1010 reports data 1050 to a hub 1020. An embodiment includes hubs transmitting coordinated preambles to the base station. However, at least some embodiments further include a virtual preamble 1055 being communicated by a network server 1040 to the base station 1030. As shown, when the virtual preamble 1055 is communicated to the base station 1030, an over-the-air preamble is not wirelessly transmitted (as depicted by 1053) through a wireless link to the base station 1030.

Once the base station 1030 has received an over-the-air wirelessly transmitted preamble or has received a virtual preamble 1055 from the network server 1040, the base station transmits a response 1060 to the virtual preamble, and to any wirelessly received preambles. The response(s) include frequency and time slot for transmission of uplink data, and unique preamble Id(s) (identification) for each of the preambles and each of the virtual preambles. For an embodiment, the responses include frequency and time slot for transmission of uplink data, unique preamble Id(s) (identification) for each of the preambles and each of the virtual preambles, and scrambling codes.

The response 1060 is then communicated 1070 to the data source. The data source provides 1080 data to the hub 1020, which then wirelessly transmits the data through uplink communication 1090 per the response 1060 received from the base station 1030.

Figure 11:
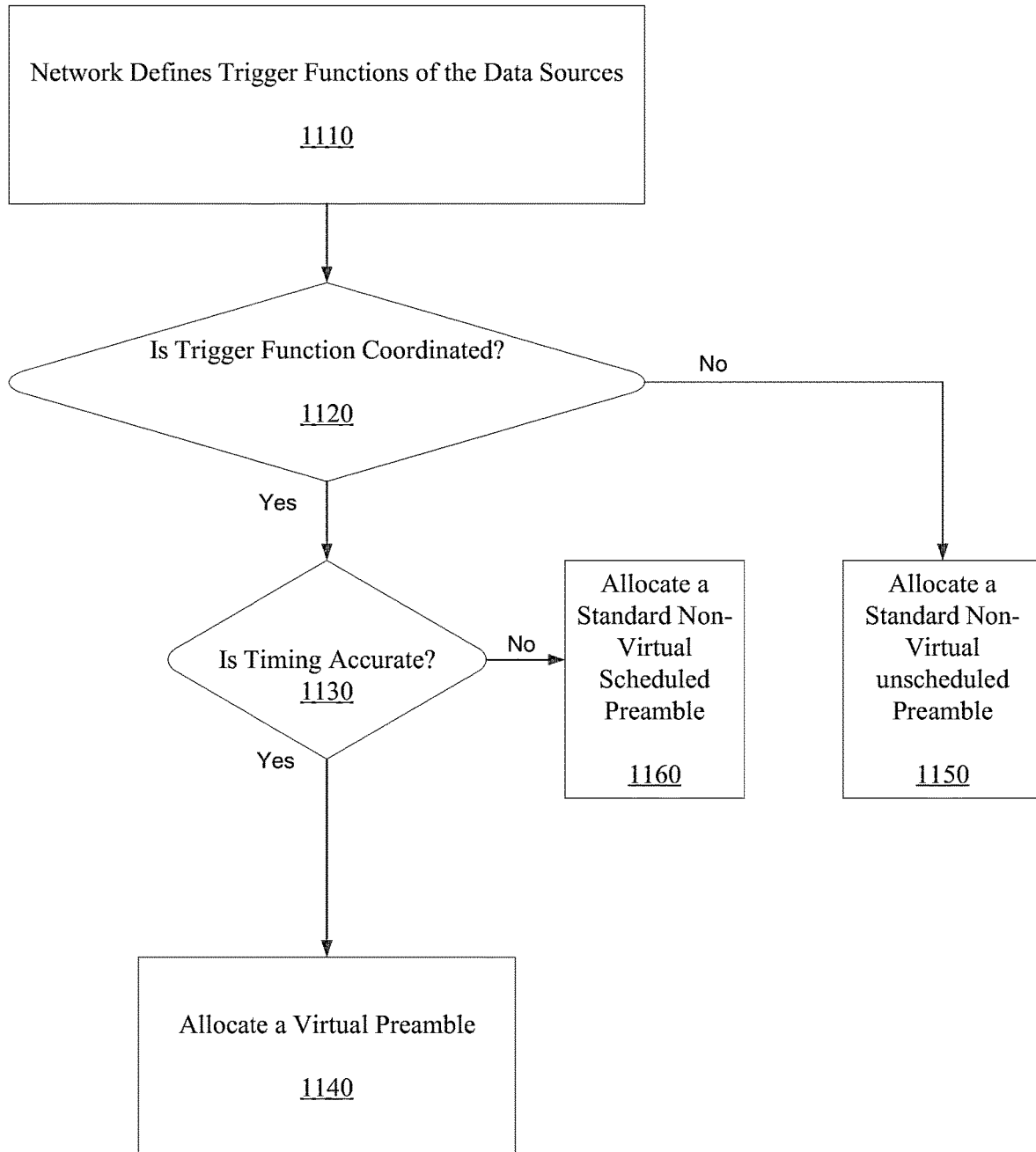
FIG. 11 is a flow chart that includes steps of a method of determining whether to allocate virtual preambles for data reporting, according to an embodiment.

FIG. 11 is a flow chart that includes steps of a method of determining whether to allocate virtual preambles for data reporting, according to an embodiment. An important element of communication 1055 of the virtual preambles from the network server 1040 to the base station 1030 is that the timing of the communication of the virtual preambles needs to be according to the scheduled communication of the preambles—so that the base station can operate to respond the same to both the preambles and the virtual preambles.

For at least some embodiments, the virtual preambles are used if a timing advance measurement is not required from the base station. For an embodiment, this is possible only when the hub knows the propagation delay between hub and base station within a required accuracy.

For at least some embodiments, the data reporting is functionally controlled. Exemplary function reporting of the data of the data sources includes periodic reporting, scheduled reporting, a trigger function (that includes, for example a Boolean function), and/or state change triggering. The first two (periodic reporting, scheduled reporting) are predictable and coordinated, whereas the second two (trigger function, state change triggering) are less predictable and not coordinated. That is, the first two can be temporally predicted, whereas the second two are condition driven and are not as temporally predictable.

As previously stated, the virtual preambles need to be provided to the base station within a coordinated time slot. Accordingly, an embodiment includes generating virtual preambles for data reporting by the data sources that are predictable and coordinated. As shown in FIG. 11, for an embodiment, a first step 1110 includes the network (for example, the network server) defining trigger (for reporting of data) functions for the data sources. Each data source can include multiple trigger functions. For each data source, a second step 1120 includes determining whether the trigger function is coordinated (for example, periodic reporting, scheduled reporting). If yes, then a third step 1130 includes determining if the timing between the hub and the base station, and the timing between the network server and the base station are accurate. If yes, then a fourth step 1140 includes allocating a virtual preamble for the data reporting per the coordinated trigger function. That is, the reporting is temporally predictable, and generation and communicating of the virtual preamble from the network server to the base station can be performed within an allocated time slot. For this embodiment, the virtual preamble can arrive at the same time as preamble would at the base station. The network server should coordinate with the base station to inject the virtual preamble to the correct slot.

For an embodiment, the third step 1130 that includes determining if the timing between the hub and the base station, and the timing between the network server and the base station are accurate, include characterizing timing synchronization performance. For an embodiment, the timing synchronization performance includes determining a wireless uplink timing synchronization accuracy between the hub and the base station. If timing synchronization performance is better than a threshold then virtual preamble can be allocated, and if it is worse then the threshold, than preambles are allocated. In order to support virtual preambles, uplink timing synchronization should be such that a "timing advance command" message is not required from the base station. For an embodiment, the base station estimates an uplink timing error and sends it to the hub as a timing advance. The hub uses timing advance to correct its uplink transmission timing for further uplink transmissions. In case of virtual preambles, since there is no over the air virtual preamble, the timing error is not estimated by base station. Thus, in order to support virtual preambles, uplink timing synchronization accuracy should be better than the defined threshold. The timing accuracy performance depends upon the capability of the hub to track satellite position and/or measure accurate round trip time of wireless communication between hub and base station through the satellite. That is, for an embodiment, the timing synchronization performance can be determined by measuring the round trip time (or propagation delay) between the hub and the base station. As previously described, for at least some embodiments, estimations of the propagation delays having an error bounds of between Delta (the first estimate threshold) and Beta (the second estimate threshold) include the use of preambles for uplink communication between the second node and the first node and virtual preamble cannot be used. For at least some embodiments, estimations of the propagation delays having an error bounds of less than Beta (the second estimate threshold) include the use of virtual preambles for uplink communication between the second node and the first node.

If the trigger function of the data to be reported is not coordinated, a fifth step 1150 includes allocating a standard non-virtual unscheduled preamble for reporting of the data. That is, the non-coordinated data reporting is not predictable, and therefore, must be reported by the hub to the base station utilizing a standard non-virtual unscheduled preamble.

If the trigger function is coordinated, by the time is not accurate, a sixth step 1160 includes allocating a standard non-virtual scheduled preamble for the reporting.

Figure 12:
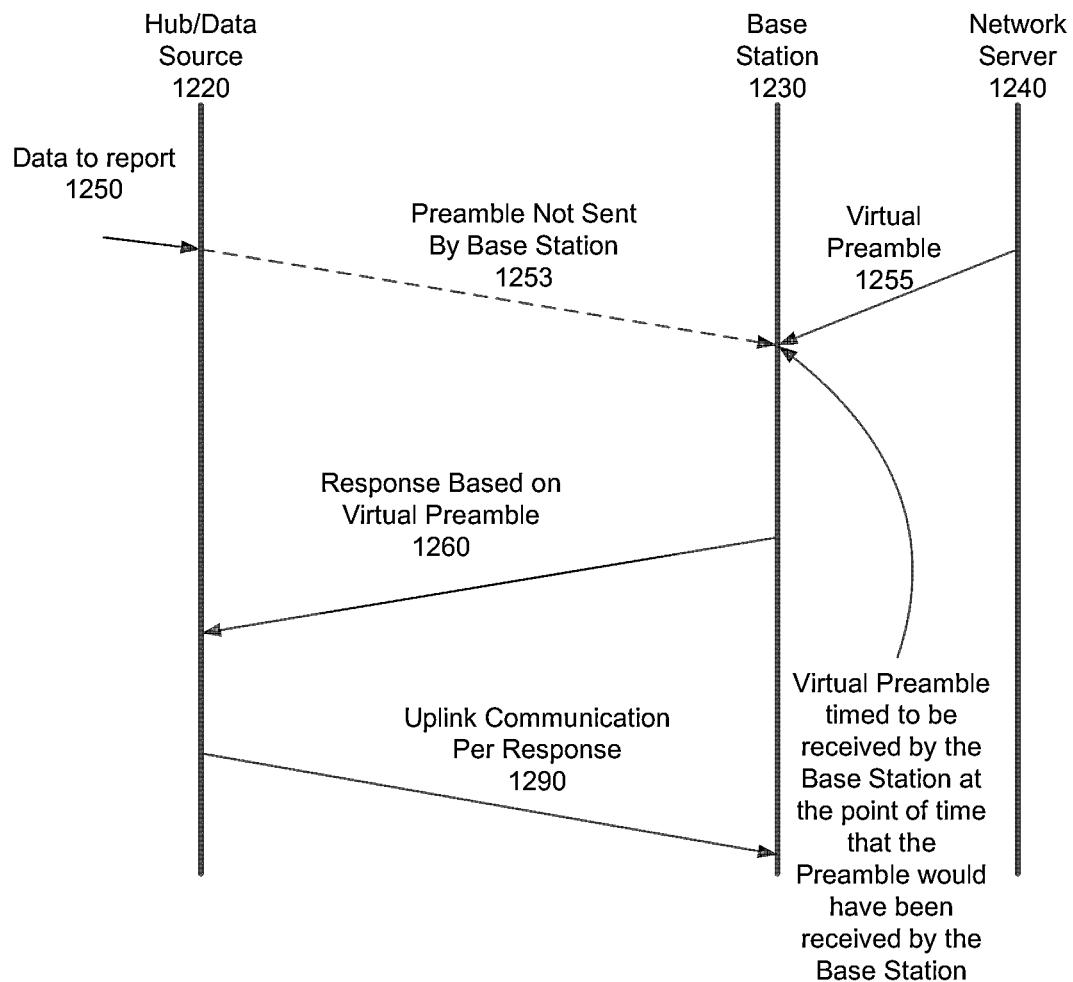
FIG. 12 shows a time-line of interactions between a hub that includes a data source, a base station and a network server, according to an embodiment.

FIG. 12 shows a time-line of interactions between a hub that includes a data source, a base station and a network server, according to an embodiment. This time-line accounts for an embodiment in which the hub 1220 includes the data source that reports has data to report 1250. Accordingly, the hub 1220 can transmit preambles (not shown) or the network server 1240 can communicate virtual preamble 1255 to the base station 1230 and the preamble 1253 is not sent by the hub 1220. Either way, the base station transmits a response 1260 to the hub upon receiving a preamble or a virtual preamble. The hub 1220 then transmits uplink communication 1290 to the base station 1230 according to the information within the response 1260.

FIG. 13 includes flow charts that include steps of processes in which a hub connects to a satellite, according to an embodiment. In a first scenario, such as, upon initially powering up the hub and provisioning the hub, a first step 1310 includes the hub connecting, for example, to the satellite. Upon connecting, a second step 1320 includes downloading a hub or data profile to the hub. In a second more frequently occurring scenario, a third step 1330 includes the hub connecting, for example, to the satellite. A fourth step 1340 includes sharing the hub profile to, for example, data devices associated with the hub. A fifth step 1350 includes requesting synchronization parameters which can be used for virtual preamble allocation and usage as shown in step 1140.

FIG. 14 is a flow chart that includes steps of a method of data reporting, according to an embodiment. A first step 1410 includes receiving, by a base station, one or more preambles from a set of one or more data sources during a scheduled time slot. A second step 1420 includes receiving, by the base station, one or more virtual preambles from a network server during the scheduled time slot, wherein the one or more virtual preambles are associated with another set of one or more data sources. A third step 1430 includes generating, by the base station, responses to the preambles and the virtual preambles, wherein the responses included scheduled time and frequency allocations for uplink communication from the set of one or more data sources and the other set of one or more data sources. A fourth step 1440 includes transmitting, by the base station, the responses to the set of one or more data sources and the other set of one or more data sources.

After the base station responds to the preambles and the virtual preambles, the base station receives uplink wireless communication from the set of one or more data sources and the other set of one or more data sources according to the scheduled time and frequency allocations.

For at least some embodiments, the slots (for example, time slots of a schedule) for the preambles and virtual preambles are pre-allocated by a network of the base station to different data sources based on data transmission requirements of the different data sources. For an embodiment, the hubs of the data sources share timing synchronization performance with the base station and base station shares the timing synchronization performance with the network server, and wherein the network server further allocates the slots for the preambles and virtual preambles based on the timing synchronization performance.

As previously described, for an embodiment, the timing synchronization performance includes a wireless uplink timing synchronization accuracy between the hub and the base station. If timing synchronization performance is better than a threshold then virtual preamble can be allocated, and if it is worse than the threshold, then preambles are allocated. In order to support virtual preambles, uplink timing synchronization should be such that a "timing advance command" message is not required from the base station. For an embodiment, the base station estimates an uplink timing error and sends it to the hub as a timing advance. The hub uses timing advance to correct its uplink transmission timing for further uplink transmissions. In case of virtual preambles, since there is no over the air virtual preamble, the timing error is not estimated by base station. Thus, in order to support virtual preambles, uplink timing synchronization accuracy should be better than the defined threshold. The timing accuracy performance depends upon the capability of the hub to track satellite position and/or measure accurate round trip time of wireless communication between hub and base station through the satellite. That is, for an embodiment, the timing synchronization performance can be determined by measuring the round trip time between the hub and the base station.

For an embodiment, the network server defines a trigger function of the virtual preambles. For an embodiment, slots for the preambles and the virtual preambles are pre-allocated based on a level of deterministic coordination of the trigger function of the virtual preambles. For an embodiment, the one or more data source communicate with the base station through one or more hubs, and wherein at least one of the hubs include a plurality of triggers, and preambles and virtual preambles are assigned to the at least one hub based on the plurality of triggers.

For an embodiment, the preambles and the virtual preambles provide notice to the base station that a hub associated with at least one data source needs to transmit over the uplink wireless link.

For an embodiment, the network server temporally coordinates the virtual preambles with the scheduled time slots, and the network server temporally coordinates the preambles with the scheduled time slots. For an embodiment, the network server additionally temporally coordinates the virtual preambles with a propagation air-time between the base station and a hub associated with at least one data source. For an embodiment, this includes the network server conveying to the hub scheduled time slots for both preambles and virtual preambles along with trigger functions.

Figure 15:
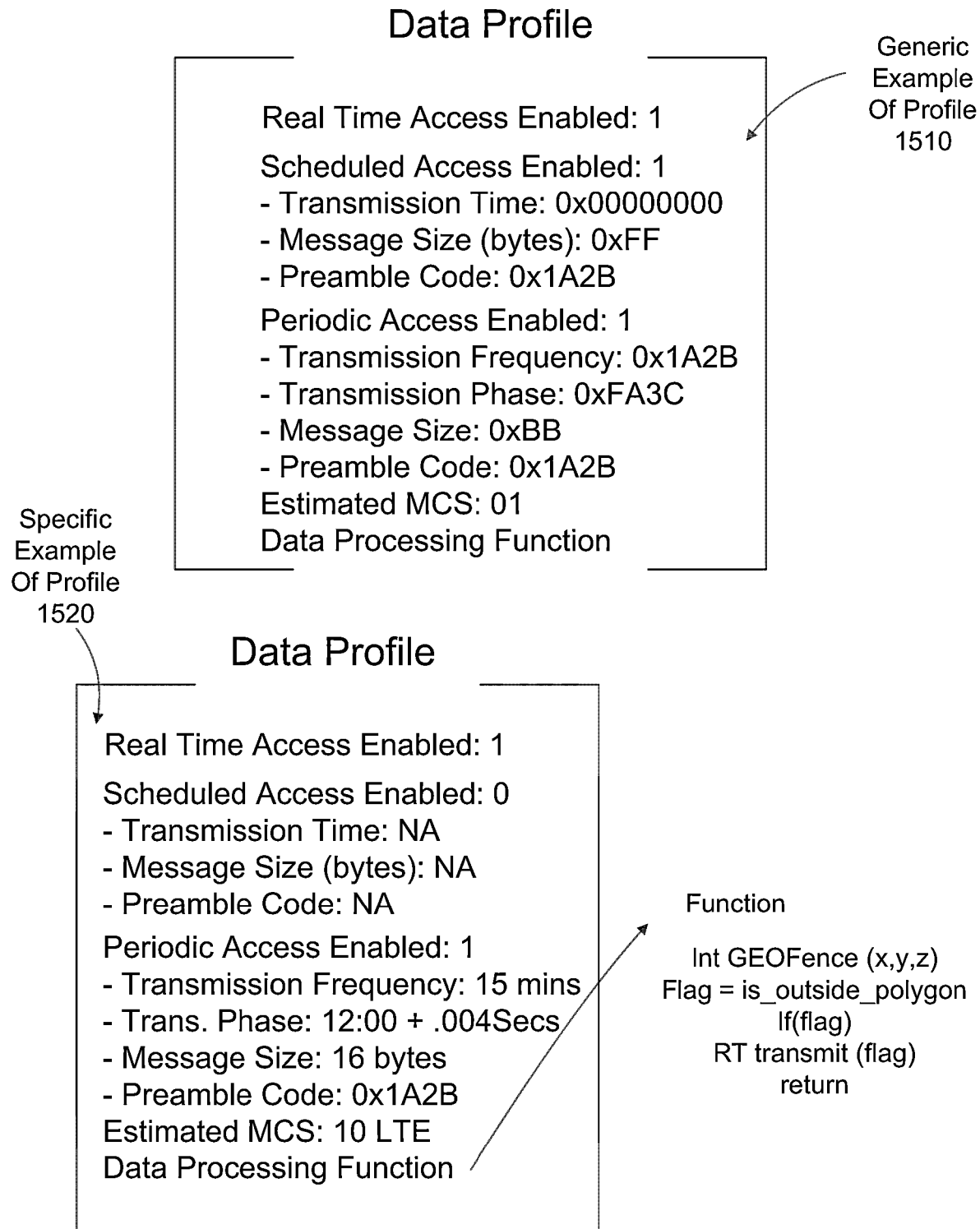
FIG. 15 shows data profiles, according to an embodiment.

For an embodiment, the responses include a preamble ID or a virtual preamble ID. For an embodiment, the responses further include a time duration in which a scrambling code is valid. For an embodiment, the scrambling code includes an RNTI (Radio Network Temporary Identifier). For an embodiment, the preambles and the virtual preambles each include identifying information, and further comprising identifying, by the base station, a resource allocation size (number of time and frequency slots) based on the identifying information FIG. 15 shows data profiles, according to an embodiment. The data profiles provide coordination of the communication of the data of the data devices over the shared wireless satellite links. The communication can include one or more of real time data reporting, scheduled data reporting, and/or periodic data reporting. The data profile for a given data device provides the hub associated with the data device the ability to control a timing of communication of the data for each of the one or more data sources from the hub to a base station through the wireless satellite link. The controlled timing provides for synchronization of the communication of the data with respect to the communication of data of other data source of both the same hub, and for one or more different hubs. For an embodiment, the data profile additionally provides the hub with a frequency allocation for the communication of the data of the data source.

An exemplary generic data profile 1510 of FIG. 15 includes enablement of real time access or real time reporting of the data of the data device, enablement of scheduled access or scheduled reporting of the data of the data device, and enablement of periodic access or periodic reporting of the data of the data device. Further, for an embodiment, the data profile also includes an estimated MCS (modulation and coding scheme). Further, for an embodiment, the data profile also includes a data processing function.

A specific example of a data profile 1520 provides for reporting of the location of a data device. This could be, for example, the reporting of data of a data device associated with a vehicle. For this embodiment, both the real time data reporting and the periodic data reporting are enabled, but the scheduled reporting is not enabled. Specifically, the periodic reporting is specified to report once every 15 minutes, beginning at 12:00 (noon). Further, the reporting packet includes a message size of 16 bytes, wherein the preamble codes and the MCS are specified. The data profile 1520 includes a specific data processing function. The exemplary function includes determining whether the data device (and therefore, the vehicle associated with the data device) is within a geographical fence. While the data device is within the geographical fence, the data device follows the periodic reporting schedule as specified by the data profile. If the data device is detected to leave an area specified by the geographical fence, the real time reporting flag is triggered, and the hub of the data device performs real time communication with the base station that includes, for example, the location of the data device as detected outside of the geographical fence.

Figure 16:
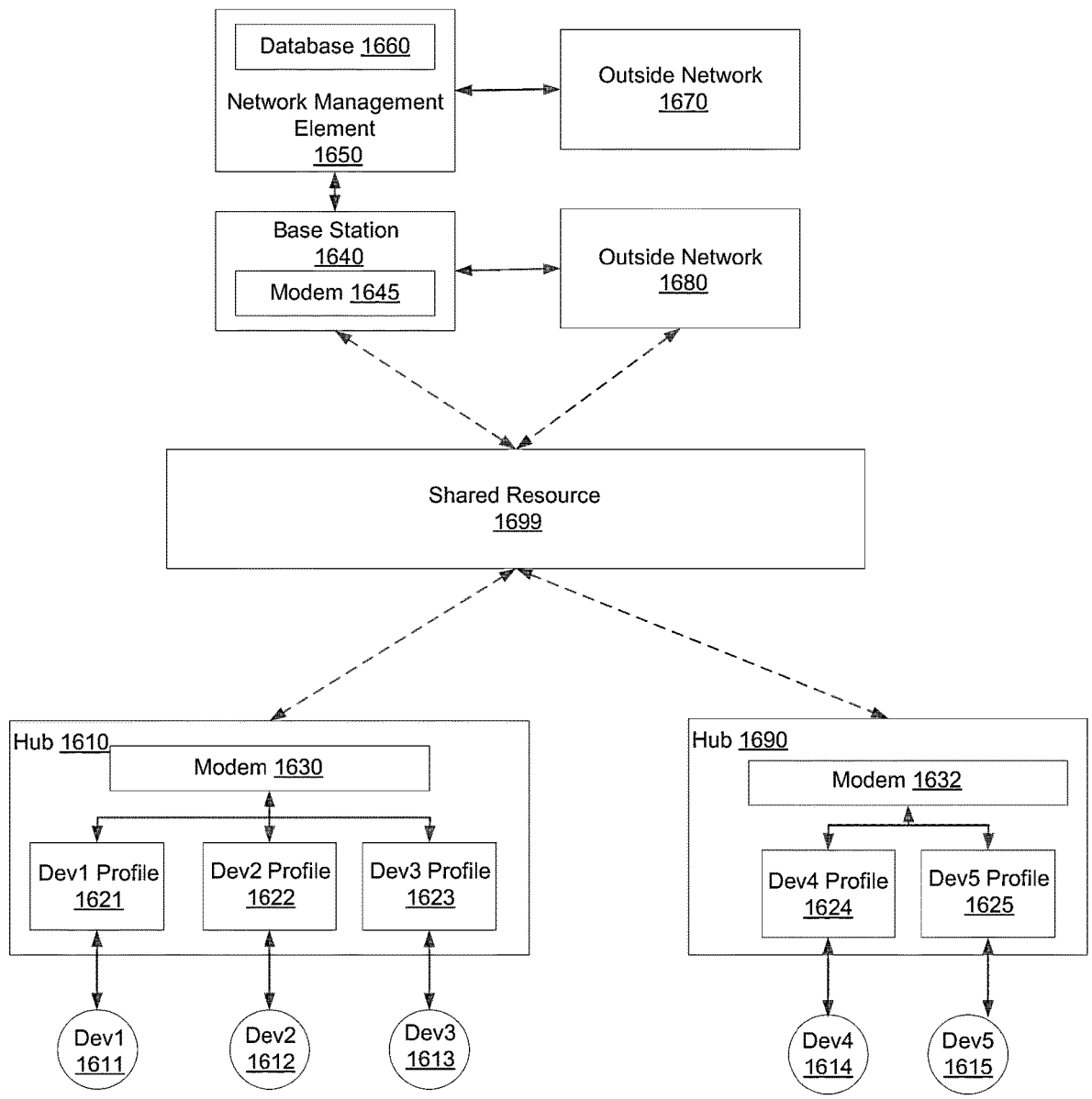
FIG. 16 shows a plurality of hubs that communicate data of data sources through a shared resource to a base station, according to an embodiment.

FIG. 16 shows a plurality of hubs 1610, 1690 that communicate data of data sources 1611, 1612, 1613, 1614, 1615 through a shared resource to a base station, according to an embodiment. As shown, the data sources 1611, 1612, 1613, 1614, 1615 are connected to the hubs 1610, 1690. The hubs 1610, 1690 communicate through modems 1630, 1632 to a modem 1645 of the base station 1640 through the wireless links. For an embodiment, the wireless links are a shared resource 1699 that has a limited capacity. The described embodiments include data profiles which are utilized to provide efficient use of the shared resource 1699. The base station may also communicate with outside networks 1670, 1680.

As previously described, it is to be understood that the data sources 1611, 1612, 1613, 1614, 1615 can vary in type, and can each require very different data reporting characteristics. The shared resource 1699 is a limited resource, and the use of this limited resource should be judicious and efficient. In order to efficiently utilize the shared resource 1699, each of the data sources 1611, 1612, 1613, 1614, 1615 are provided with data profiles 1621, 1622, 1623, 1624, 1625 that coordinate the timing (and/or frequency) of reporting (communication by the hubs 1610, 1690 to the base station 1640 through the shared resource 1699) of the data provided by the data sources 1611, 1612, 1613, 1614, 1615.

For an embodiment, a network management element 1650 maintains a database 1660 in which the data profiles 1621, 1622, 1623, 1624, 1625 can be stored and maintained. Further, the network management element 1650 manages the data profiles 1621, 1622, 1623, 1624, 1625, wherein the management includes ensuring that synchronization is maintained during the data reporting by the hubs 1610, 1690 of the data of each of the data sources 1611, 1612, 1613, 1614, 1615. That is, the data reported by each hub 1610, 1690 of the data of the data sources 1611, 1612, 1613, 1614, 1615 maintains synchronization of the data reporting of each of the data sources 1611, 1612, 1613, 1614, 1615 relative to each other. Again, the network management element 1650 ensures this synchronization through management of the data profiles 1621, 1622, 1623, 1624, 1625. The synchronization between the data sources 1611, 1612, 1613, 1614, 1615 distributes the timing of the reporting of the data of each of the data sources 1611, 1612, 1613, 1614, 1615 to prevent the reporting of one device from interfering with the reporting of another device, and provides for efficiency in the data reporting.

For at least some embodiments, the network management element 1650 resides in a central network location perhaps collocated with multiple base stations and/or co-located with a network operations center (as shown, for example, in FIG. 6). For an embodiment, the network management element 1650 directly communicates with the base station 1640 and initiates the transfer of data profiles across the network via the base station 1640 to the hubs 1610, 1690.

For at least some embodiments, data profiles are distributed when new hubs are brought onto the network, when hubs change ownership, or when the hubs are re-provisioned. Other changes to data profile contents outside of these situations are more likely addressed by sync packets (for an embodiment, a sync packet is a packet to update the value of a specific field inside of a data profile, but not necessarily updating the structure of the data profile) were only small changes to profile fields are required.

As described, the data profiles 1621, 1622, 1623, 1624, 1625 control timing of when the hubs 1610, 1690 communicate the data of the data sources 1611, 1612, 1613, 1614, 1615 through the shared resource 1699. Accordingly, the described embodiments coordinate access to the shared resource 1699 to insure optimal usage of the network resource to avoid collisions between packets, the transmission of redundant information, and to reshape undesired traffic profiles.

Although specific embodiments have been described and illustrated, the embodiments are not to be limited to the specific forms or arrangements of parts so described and illustrated. The described embodiments are to only be limited by the claims.

What is claimed:

1. A method, comprising:
   detecting, by a hub, presence of a satellite network;
   detecting, by the hub, presence of a terrestrial network;
   selecting, by the hub, to connect to one of the satellite network or the terrestrial network based on a priority ruleset;
   estimating a propagation delay between the hub and a base station of the satellite network when the satellite network is selected;
   adjusting, by the hub, a timing offset between transmit and receive radio frames at the hub based on whether the satellite network or the terrestrial network is selected, and based at least on the propagation delay and a frame offset between uplink and downlink frames at base station;
   configuring air interface communication protocol timer values, including a wait time for a response, and a contention resolution timer, based on the estimated propagation delay and the frame offset, wherein the frame offset, the timing offset, and the wait time for the response are adjusted based on the estimated propagation delay to allow connection to the satellite network and the terrestrial network;
   and
   communicating, by the hub, with the base station of the satellite network when the satellite network is selected, and with a base station of the terrestrial network when the terrestrial network is selected.

2. The method of claim 1, further comprising broadcasting, by the base station, the frame offset over the satellite network.

3. The method of claim 1, further comprising selecting the adjusted timing offset between the between transmit radio frames and receive radio frames based on a fixed-frame offset between the hub and the base station of the satellite network, and the estimated propagation delay.

4. The method of claim 1, further comprising adjusting, by the hub, response wait times of the hub based on the estimated propagation delay and the frame offset between transmit radio frames and receive radio frames.

5. The method of claim 1, further comprising selecting a RF (radio frequency) configuration based on whether the satellite network or the terrestrial network is selected, including:
   selecting a frequency selective antenna configuration based on whether the satellite network or the terrestrial network is selected.

6. The method of claim 5, further comprising:
   selecting a beamforming antenna configuration when the satellite network is selected that includes a beam direction; and selecting an omnidirectional antenna configuration when the terrestrial network is selected.

7. The method of claim 5, further comprising:
selecting a subset of hub antennas when the terrestrial network is selected;
selecting a higher gain antenna configuration when the satellite network is selected.

8. The method of claim 1, wherein estimating the propagation delay between the hub and at least one of the satellite network or the terrestrial network comprises:
1. receiving, by the hub, from the satellite network or the terrestrial network a packet containing a first timestamp representing the transmit time of the packet;
2. receiving, by the hub, from a local time source, a second timestamp corresponding with a time of reception of the first timestamp received from the hub;
3. calculating a time difference between the first timestamp and the second timestamp;
4. storing the time difference between the first timestamp and the second timestamp;
5. calculating, by the hub, a predictive model for predicting the propagation delay based the time difference between the first timestamp and the second timestamp; and
6. estimating, by the hub, the propagation delay between the hub and the satellite network or the terrestrial network at a time, comprising querying the predictive model with the time.

9. The method of claim 8, wherein when the estimated propagation delay is within an error estimate threshold, then eliminating a requirement for timing advance data to be sent from the base station to the hub.

10. The method of claim 8, wherein when the estimated propagation delay is within an error estimate threshold, then further comprising:
receiving, by the satellite network or the terrestrial network, one or more preambles from a set of one or more data sources of the hub during a scheduled time slot;
receiving, by the satellite network or the terrestrial network, one or more virtual preambles from a network server during the scheduled time slot, wherein the one or more virtual preambles are associated with another set of one or more data sources of the hub;
generating, by the satellite network or the terrestrial network, responses to the preambles and the virtual preambles, wherein the responses included scheduled time and frequency allocations for uplink communication from the set of one or more data sources and the other set of one or more data sources; and
transmitting, by the satellite network or the terrestrial network, the responses to the set of one or more data sources and the other set of one or more data sources.

11. The method of claim 1, further comprising periodically switching between the satellite network and the terrestrial network to scan for SIB (system information block) messages and to scan for availability of the satellite network and the terrestrial network.

12. The method of claim 11, further comprising dynamically switching sim (subscriber identity model) profiles based on a hub ruleset, the SIB messages, and the availability of the of the satellite network and the terrestrial network.

13. The method of claim 12, further comprising using a same sim (subscriber identity model) profile for both terrestrial or satellite network.

14. The method of claim 1, wherein the priority ruleset comprises one or more of:
a type of data traffic to be communicated between the hub and at least one of the satellite network or the terrestrial network;
latency or time response requirements;
network conditions, wherein the network conditions include one or more of error rates, latency, or capacity of the terrestrial network and the satellite network;
a location of the hub; or
a calculated propagation delay and a broadcast frame offset.

15. The method of claim 1, further comprising scanning during sleep cycles, by the hub, non-active communication bands for preference of allowable channels, thereby maximizing time on a priority network, and minimizing network switching time.

16. The method of claim 1, further comprising performing, by the hub, a doppler correction upon the satellite network upon sensing some conditions including sensing a rate of change of the estimated propagation delay.

17. The method of claim 1, wherein the priority ruleset is dynamically updated by a system server.

18. The method of claim 1, further comprising balancing communication loads of a plurality of hub between the satellite network and the terrestrial network to reduce contention and optimum network usage.

19. A wireless hub operative to:
detect presence of a satellite network;
detect presence of a terrestrial network;
select to connect to one of the satellite network or the terrestrial network based on a priority ruleset;
estimate a propagation delay between the hub and a base station of the satellite network when the satellite network is selected;
adjust a timing offset between transmit and receive radio frames at the hub based on whether the satellite network or the terrestrial network is selected, and based at least on the propagation delay and a frame offset between uplink and downlink frames at base station;
configure air interface communication protocol timer values, including a wait time for a response, and a contention resolution timer, based on the estimated propagation delay and the frame offset, wherein the frame offset, the timing offset, and the wait time for the response are adjusted based on the estimated propagation delay to allow connection to the satellite network and the terrestrial network;
and
communicate with the base station of the satellite network when the satellite network is selected, and with a base station of the terrestrial network when the terrestrial network is selected.

* * * * *